(12) United States Patent
Rivera, Jr. et al.

(10) Patent No.: US 9,980,583 B2
(45) Date of Patent: *May 29, 2018

(54) MOBILE FOLDING RESTAURANT BOOTH STYLE BENCH

(71) Applicant: AmTab Manufacturing Corporation, Aurora, IL (US)

(72) Inventors: Jeremias C. Rivera, Jr., Elmhust, IL (US); Doss Samikkannu, Des Plaines, IL (US)

(73) Assignee: Amtab Manufacturing Corporation, Aurora, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/338,148

(22) Filed: Oct. 28, 2016

(65) Prior Publication Data

US 2017/0238729 A1    Aug. 24, 2017

Related U.S. Application Data

(63) Continuation-in-part of application No. 15/048,596, filed on Feb. 19, 2016, now Pat. No. 9,738,116.

(51) Int. Cl.
*A47B 83/02*    (2006.01)
*A47F 10/06*    (2006.01)
(Continued)

(52) U.S. Cl.
CPC .............. *A47F 10/06* (2013.01); *A47B 83/02* (2013.01); *A47C 7/006* (2013.01); *A47C 7/566* (2013.01);
(Continued)

(58) Field of Classification Search
CPC ........... A47B 83/02; A47C 7/566; A47C 7/60; A47C 11/00; A47F 10/06
(Continued)

(56) References Cited

U.S. PATENT DOCUMENTS 3,028,197 A * 4/1962 Kermit ..................... A47B 3/14
 297/124
3,061,369 A * 10/1962 Haunost ................. A47B 85/04
 297/167 X (Continued)

*Primary Examiner* — Rodney B White
(74) *Attorney, Agent, or Firm* — Hinshaw & Culbertson LLP

(57) ABSTRACT

Mobile folding restaurant booth style benches are provided, which may be arranged in opposed pairs to form restaurant style booths. An individual bench incorporates a mechanism for shifting the weight of the bench between a mobile base, which may be supported by swivel casters, and a stationary base, which may be supported by non-slip feet, actuated by pivoting a bench seat down from a folded storage position to an unfolded seating position. The weight shifting mechanism may include an engagement member, which is initially spaced apart from an actuator at a folded angle of the seat, and which contacts and begins transmitting force and movement to the actuator at a partially unfolded angle of the seat. Preferably, the bench further includes a biasing component that biases the stationary base upward relative to the mobile base, a locking mechanism that resists a force provided by the biasing component to retain the bench seat in the unfolded seating position, contoured shells or other covers for the seat and a seat back, and a back panel extending vertically above the seat back.

20 Claims, 19 Drawing Sheets

(51) Int. Cl.
*A47C 7/56* (2006.01)
*A47C 11/00* (2006.01)
*A47C 7/00* (2006.01)
*A47C 7/60* (2006.01)
*B60B 33/00* (2006.01)
*B60B 33/06* (2006.01)

(52) U.S. Cl.
CPC ............... *A47C 7/60* (2013.01); *A47C 11/00* (2013.01); *B60B 33/006* (2013.01); *B60B 33/063* (2013.01)

(58) Field of Classification Search
USPC ..................... 297/157.1–159.1, 332
See application file for complete search history.

(56) References Cited

U.S. PATENT DOCUMENTS

| | | | | |
|---|---|---|---|---|
| 3,337,262 A * | 8/1967 | Katzfey | ................ | A47B 3/14 297/158.4 X |
| 3,594,037 A * | 7/1971 | Sherman | ................ | A47C 1/036 297/332 X |
| 3,715,143 A * | 2/1973 | Gerken | ................ | A47B 3/14 297/158.4 X |
| 4,606,575 A * | 8/1986 | Kodet | ................ | A47B 83/02 108/133 |
| 4,949,649 A * | 8/1990 | Terres | ................ | E04H 3/28 108/116 |
| 5,349,789 A * | 9/1994 | Andert | ................ | E04H 3/126 52/7 |
| 5,392,718 A * | 2/1995 | Stevens | ................ | E04H 3/28 108/167 |
| 5,615,451 A * | 4/1997 | Peterson | ................ | B60B 33/06 16/34 |
| 7,226,125 B2 * | 6/2007 | Frobose | ................ | A47B 3/14 297/158.4 X |
| 7,469,966 B1 * | 12/2008 | Vallee | ................ | A47C 1/121 297/146 |
| 8,182,032 B2 * | 5/2012 | Dickey | ................ | A47B 3/14 297/157.1 |
| 8,820,826 B2 * | 9/2014 | Dickey | ................ | A47B 3/14 297/158.4 X |
| 9,370,265 B2 * | 6/2016 | Whittington | ................ | A47F 10/06 |
| 9,738,116 B1 * | 8/2017 | Rivera, Jr. | ................ | B60B 33/063 |
| 2008/0116724 A1 * | 5/2008 | Dickey | ................ | A47B 3/14 297/158.4 |

* cited by examiner

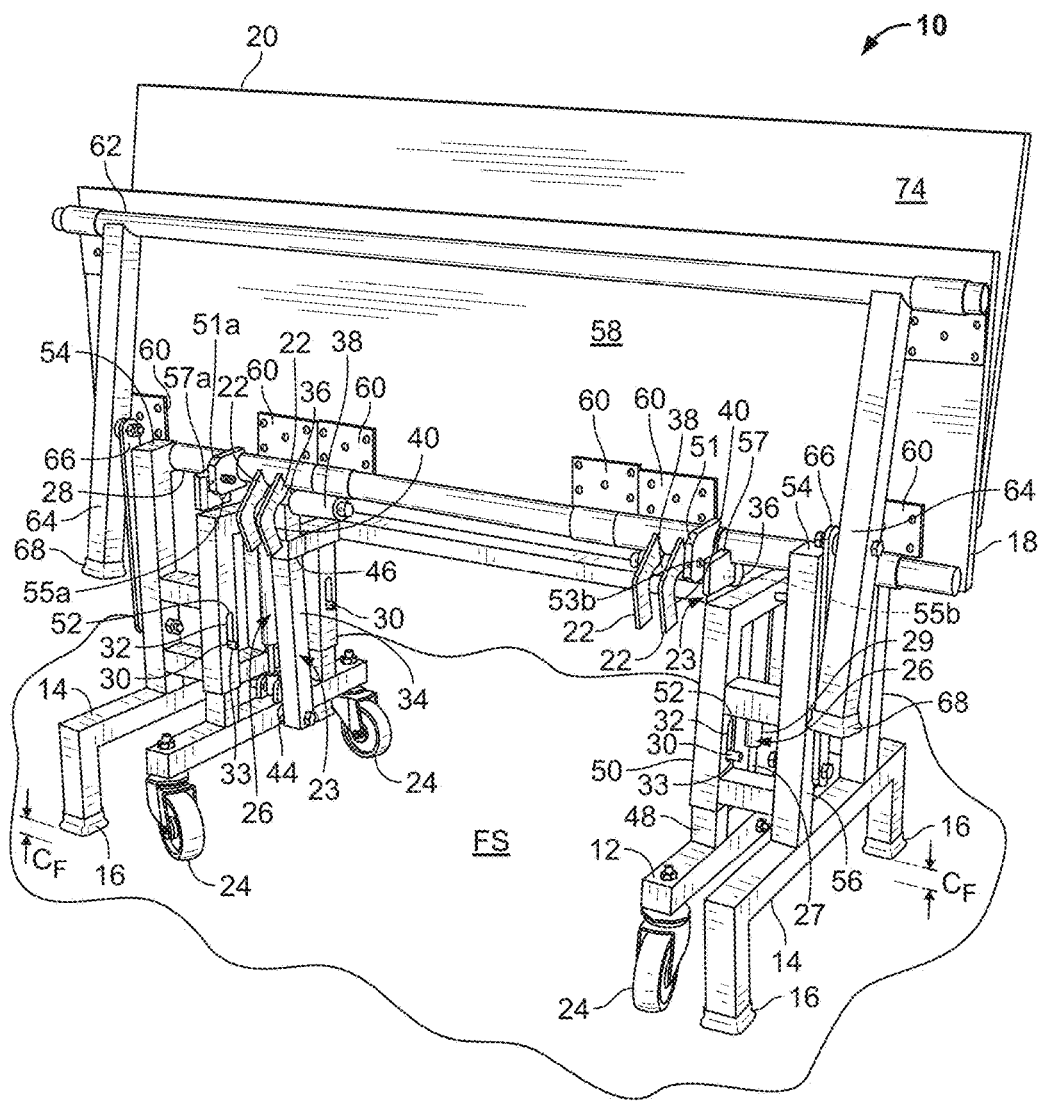
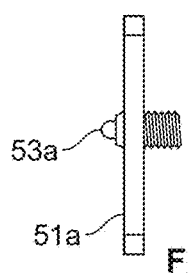
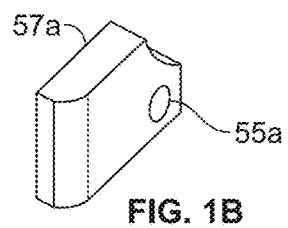
FIG. 1
FIG. 1A
FIG. 1B

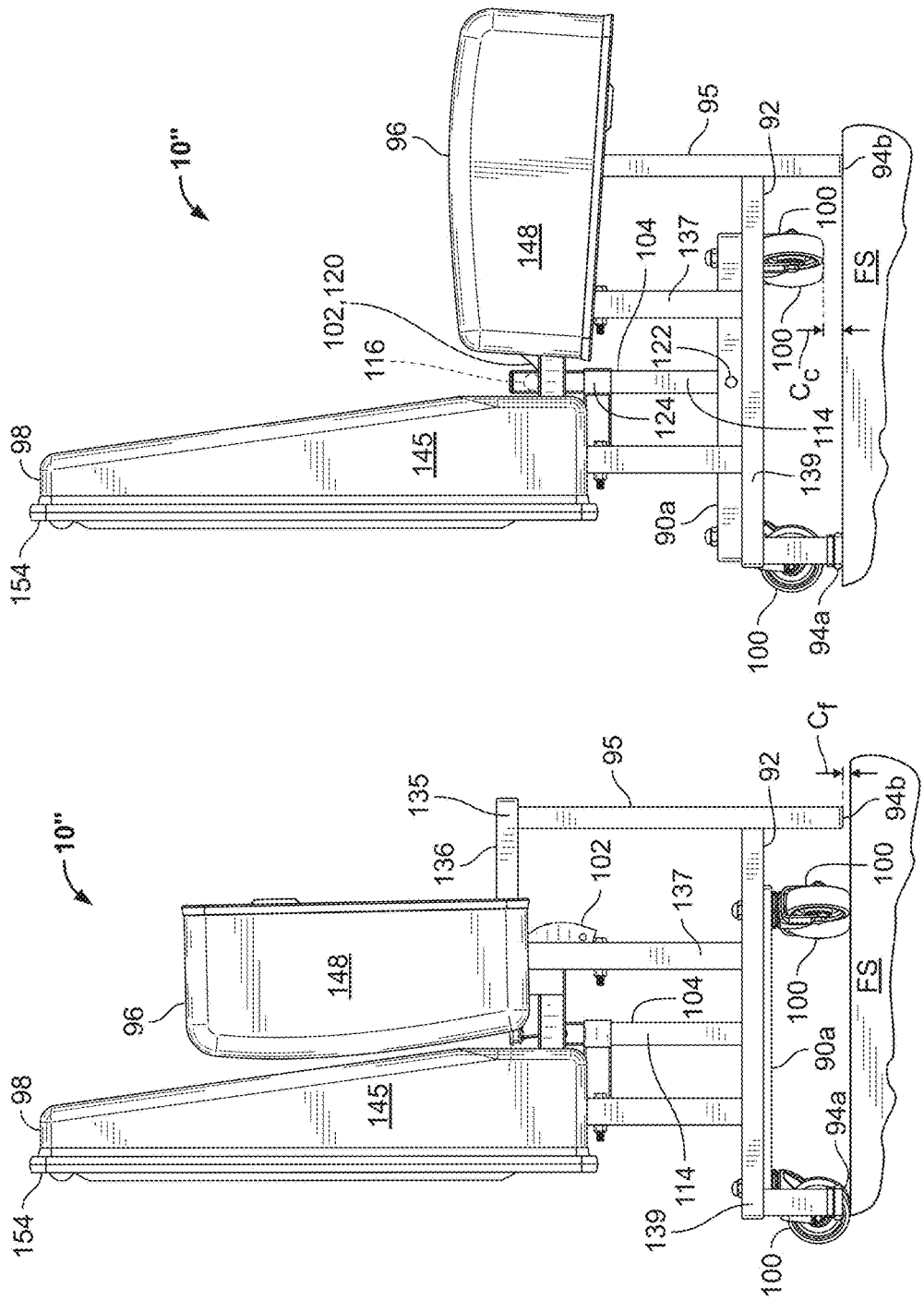

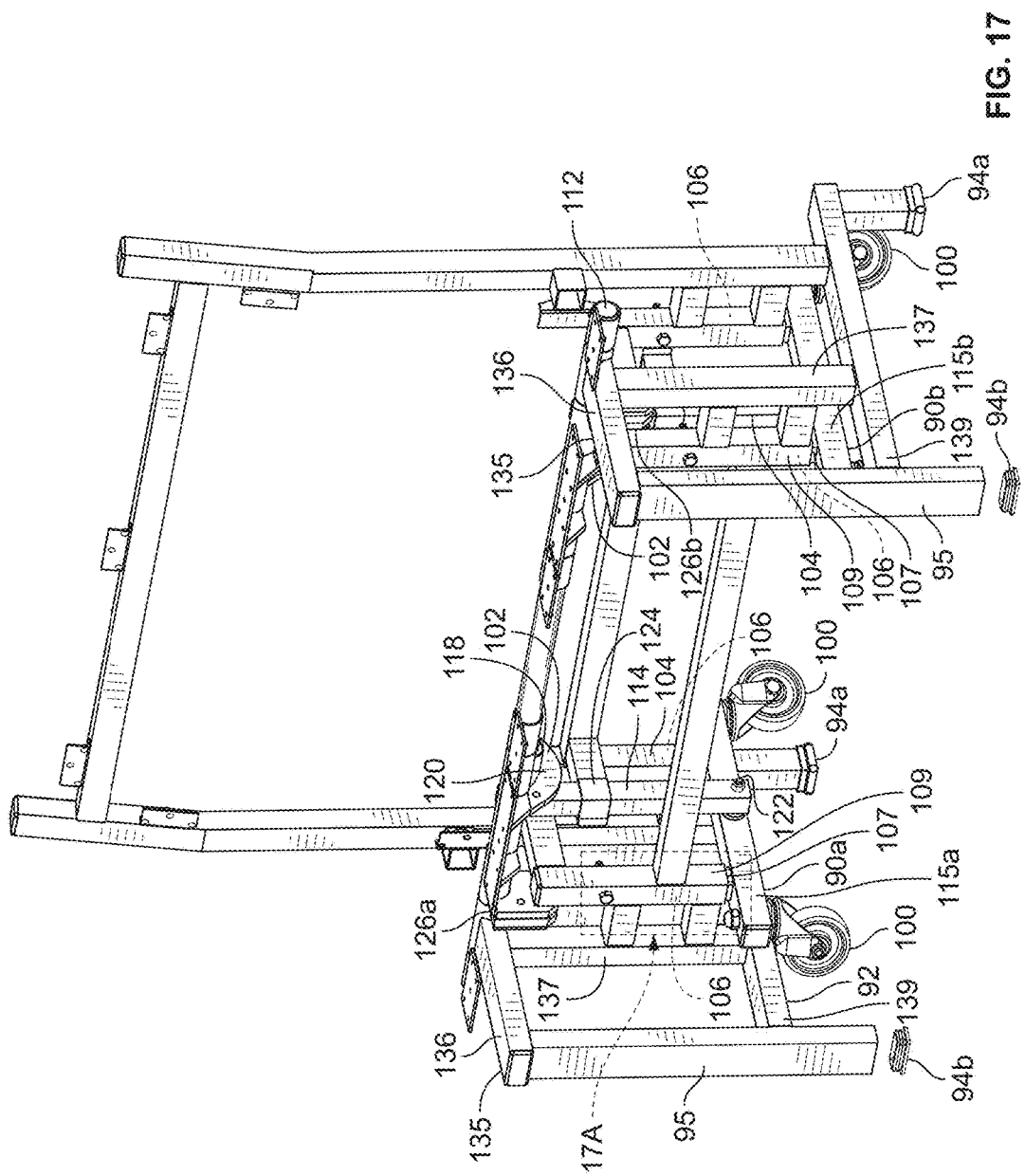

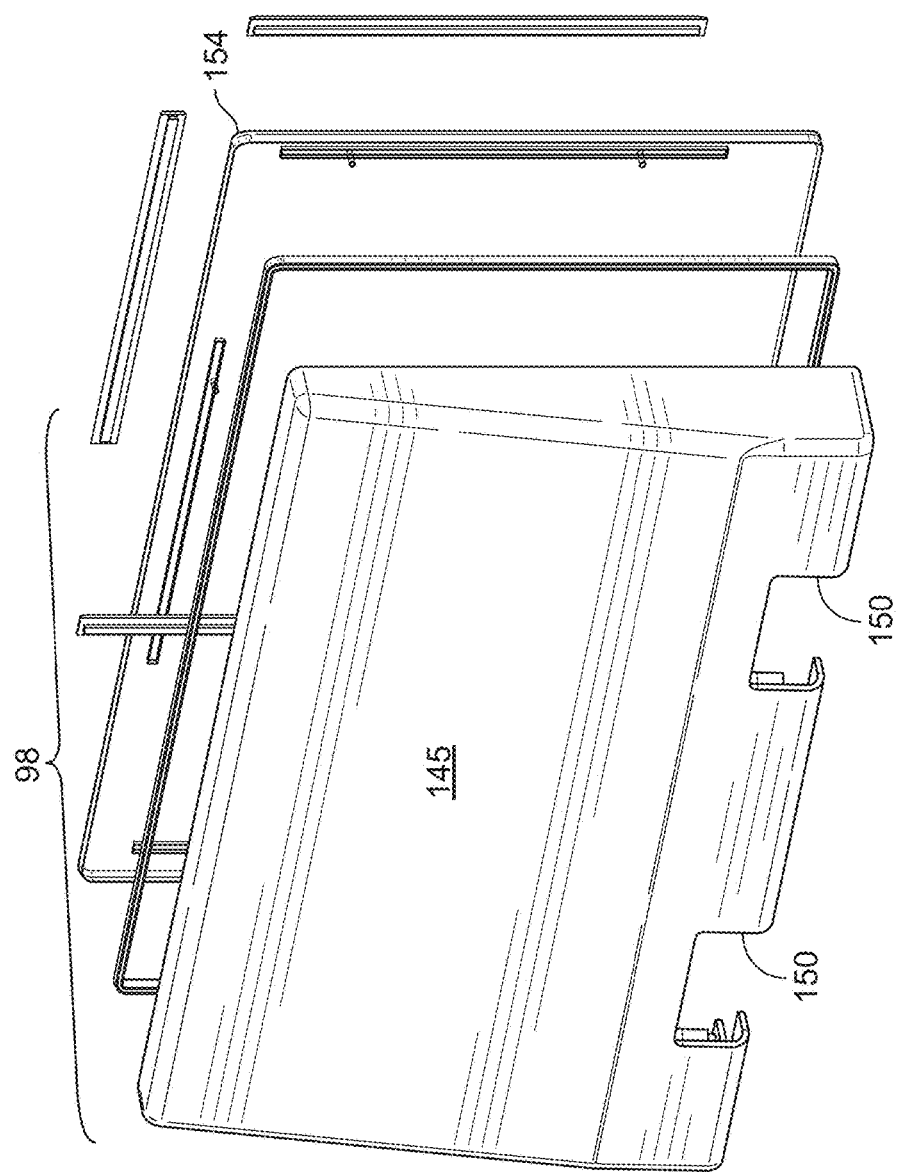

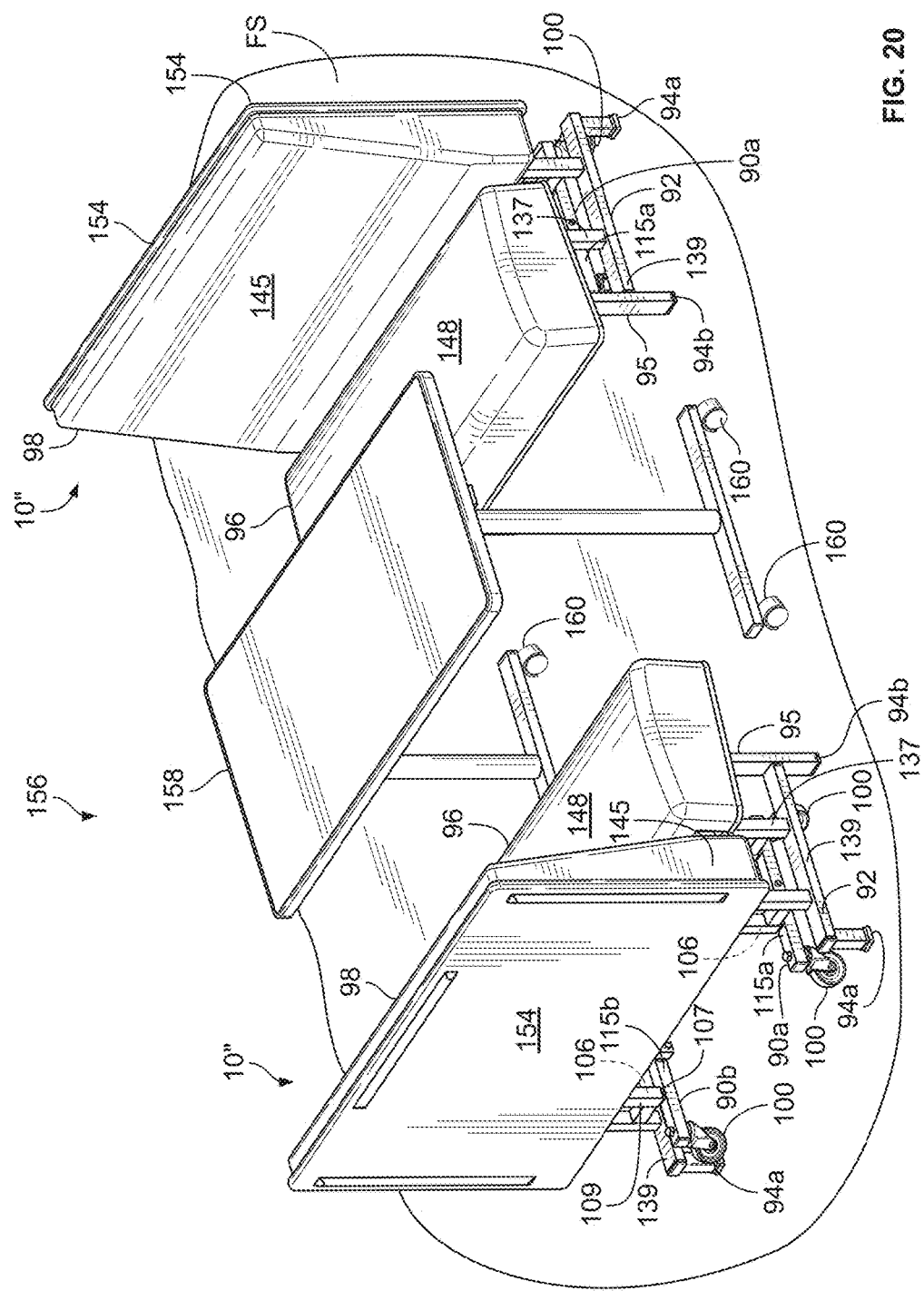

MOBILE FOLDING RESTAURANT BOOTH STYLE BENCH

CROSS REFERENCE TO RELATED APPLICATION

This application is a continuation in part of U.S. patent application Ser. No. 15/048,596, filed Feb. 19, 2016, now U.S. Pat. No. 9,738,116 B1, the entire contents of which are incorporated herein by reference.

FIELD OF THE INVENTION

The present invention relates to mobile bench seating and, more particularly, to mobile bench seating styled such that opposed pairs of bench seating units arranged with a table between them resemble a typical restaurant booth.

BACKGROUND

Many people enjoy booth style seating. Compared to a table with individual movable or attached stools or chairs, booth style seating can provide comfort and create intimacy in a public setting, with its typical wide, contoured or cushioned seats, high seat backs, and frequently a privacy panel extending above the top of the seat backs. Thus, booth seating is commonly included in the customer dining/lounge areas of restaurants, bars, coffee shops, and the like. However, booth style seating has been traditionally less common in school cafeterias and other institutional settings, where demands of mobility, efficient storage, and ease of cleaning often outweigh concerns regarding comfort and intimacy. Due to high seat backs, privacy panels, and the prevalence of unused bench surface between occupants which would otherwise be empty space between individual chairs or stools, booth seating is typically more bulky and heavier than individual seating, making it more difficult to move and store. Moreover, in addition to immobility, the typical positioning of booth seating next to a wall compounds the difficulty of cleaning on, around, and under booths.

A need therefore exists for a booth style bench that can provide comfort and privacy without sacrificing mobility, space-efficient storage, and ease of cleaning.

SUMMARY OF THE INVENTION

According to an aspect of the invention, a mobile folding bench is provided, which converts between a mobile folded storage position and a stationary unfolded seating position simply by pivoting a seat between the two positions. The bench comprises a generally vertically oriented seat back comprising a forward facing seat back surface configured to support the back of a sitting human occupant; a seat comprising a sitting surface configured to seat the human occupant, the seat disposed in front of the seat back; a mobile base comprising at least one mobile floor surface contacting support member; a stationary base comprising at least one stationary floor surface contacting support member; the seat back being supported by at least one of the mobile base and the stationary base; a base biasing member connected between the mobile base and the stationary base and biasing the stationary base in a generally upward direction relative to the mobile base; and a base lifting member operatively connected to the seat and configured to transmit a lifting force to the stationary base to lift the mobile base relative to the stationary base when the seat is moved from the folded position to the seating position, so that the folding bench is supported on the floor surface by the stationary support member. The mobile floor surface contacting support member may be any support member configured to facilitate lateral movement across a floor surface, such as a glide or swivel caster. The stationary base is movably coupled to the mobile base to permit at least vertical movement of the stationary base relative to the mobile base, and the stationary support member preferably inhibits lateral movement of the stationary base relative to the floor surface. The seat is supported by and pivotally coupled to the stationary base to move between a seating position in which the sitting surface is at a generally horizontal sitting angle and a folded position in which the sitting surface is at a generally vertical folded angle. The biasing member preferably provides a sufficient base biasing force to maintain the stationary support member at a vertical clearance distance above the floor surface when the mobile support member contacts the floor surface and the seat is in the folded position, so that the folding bench is supported on the floor surface by the mobile support member.

In one embodiment, the folded angle of the sitting surface is inclined at least about 45° relative to the floor surface.

In another embodiment, the seat back is supported by the stationary base.

In yet another embodiment, the engagement member is integral to the seat.

In still another embodiment, the bench further comprises an actuation member operatively connected to the mobile base, the engagement member configured to contact the actuation member and to transmit a lifting force from the stationary base to the mobile base through the actuation member during movement of the seat from the folded position to the seating position. The engagement member may be configured to contact the actuation member at an engagement position of the seat between the folded position and the seating position, to be spaced apart from the actuation member when the seat is between the folded position and the engagement position, and to remain in contact with the actuation member when the seat is between the engagement position and the seating position. A hook-shaped contact portion of the engagement member may have a curved profile configured to maintain generally vertical normal contact with a lower portion of the actuation member during pivotal movement of the engagement member and vertical movement of the actuation member. The actuation member may comprise a generally horizontal bar housed in a bushing, the bushing configured to be contacted by the engagement member and to rotate around the bar during movement of the engagement member in contact with the bushing to inhibit rubbing between the engagement member and the actuation member. The actuation member may be pivotally connected or integrally attached to the mobile base, or otherwise configured to move vertically in concert with the mobile base.

In yet another embodiment, a generally downward facing surface of the seat is configured to abut a generally upward facing surface of the stationary base when the seat is in the seating position, to prevent over-travel of the seat past the seating position. The seat may additionally be supported on the floor surface by a leg that pivots from a stowed position adjacent to or stowed within the seat, when the seat is folded to the mobile storage position, to a generally perpendicular orientation relative to the seat extending downwardly to the floor surface when the seat is unfolded to the seating position. Alternatively, the upward facing surface of the stationary base may be an upward facing surface of a fixed leg beam joined to a top end of a fixed leg, and the fixed leg may be an elongate leg extending generally vertically from the fixed leg beam down to a non-slip foot at the bottom of the fixed leg which contacts the floor surface when the seat is in the seating position. The non-slip foot at the bottom of the fixed leg may be located generally below the upward facing surface of the fixed leg beam. For example, the foot may be located directly below the upward facing surface, or it may slightly offset therefrom, such as in a forward direction, to provide enhanced tipping prevention.

In still another embodiment, the stationary base is connected to the mobile base by a sliding connection constraining the stationary base to generally vertical upward and downward movement relative to the mobile base. This sliding connection may comprise a smaller perimeter tube integral to one of the stationary base and the mobile base slidingly housed in a larger perimeter tube integral to the other of the stationary base and the mobile base. In this and other embodiments, the bench may further comprise a stop mechanism to limit vertical travel of the stationary base relative to the mobile base to movement between an uppermost position of the stationary base and a lowermost position of the stationary base. In particular, a generally horizontal pin may be carried by one of the smaller perimeter tube and the larger perimeter tube, the other of the smaller perimeter tube and the larger perimeter tube comprising a generally vertical slot slidably receiving the pin, the slot comprising an upper end and a lower end, the pin abutting against one of said ends of the slot at an uppermost position of the stationary base relative to the mobile base, and the pin abutting against the other of said ends of the slot at a lowermost position of the stationary base relative to the mobile base, to prevent upward movement of the stationary base from said uppermost position or downward movement of the stationary base from said lowermost position.

In yet another embodiment, the bench further comprises a retention mechanism configured to be engaged when the seat is in the seating position and to resist movement of the seat away from the seating position or upward movement of the stationary base relative to the mobile base. The retention mechanism may, for example, comprise a locking pin engaging a locking hole in one or both of the stationary base and the mobile base when the seat is in the seating position and the stationary support member is contacting the floor surface, so that movement of the seat toward the folded position or downward movement of the mobile base relative to the stationary base requires a human user manually withdrawing the locking pin from the locking hole. Alternatively, the retention mechanism comprises a detent mechanism in which a rounded surface of a detent member carried by one of the stationary base and the mobile base is received by and generally horizontally biased into a detent recess carried by the other of the stationary base and the mobile base, so that movement of the seat toward the folded position or downward movement of the mobile base relative to the stationary base requires applying a force sufficient to dislodge the detent member from the detent recess, the base biasing force of the base biasing member being insufficient to dislodge the detent member from the detent recess. The latter detent mechanism has the advantage over the locking pin mechanism of facilitating passive engagement and disengagement triggered by the single motion of pivoting the seat.

According to another aspect of the invention, a method of arranging restaurant booth style seating using two mobile folding benches and a table is provided. Each mobile folding bench may comprise any of the above-described combinations of elements according to the mobile folding bench aspect of the invention. The method comprises moving a first one of the benches having a first seat in the folded position and a first mobile base engaging a floor surface, to a position in which a first seat back surface of the first bench faces a first side of the table; unfolding the first seat to the seating position to cause a first mobile base of the first bench to disengage from the floor surface and a first stationary base of the first bench to engage the floor surface; moving a second one of the benches having a second seat in the folded position, having a second mobile base engaging a floor surface, to a position in which a second seat back surface of the second bench faces a second side of the table; and unfolding the second seat to the seating position to cause a second mobile base of the second bench to disengage from the floor surface and a second stationary base of the second bench to engage the floor surface.

In one embodiment in which one or both of the mobile folding benches comprises a manually engaged retention mechanism such as a retractable locking pin mechanism, the method further comprises engaging the retention mechanism when the respective seat is in the seating position, the retention mechanism resisting the respective base biasing force of the respective base biasing member to retain the respective seat in the seating position and the respective stationary frame in engagement with the floor surface.

BRIEF DESCRIPTION OF THE DRAWINGS

FIG. 1 is a front perspective view of a mobile folding bench according to an aspect of the invention, in a mobile, folded storage position, with seat back and seat shells removed to reveal its mechanisms.

FIG. 1A is a bottom plan view of a spring loaded ball component for use in a retention mechanism in a bench as in FIG. 1.

FIG. 1B is a perspective view of a ball recess component for use in conjunction with the spring loaded ball component shown in FIG. 1A.

FIG. 13 is a right side elevation view of the mobile bench of FIG. 12, in a mobile storage position.

FIG. 14 is a right side elevation view of the mobile bench of FIG. 12, in the seating position.

FIG. 17 is a perspective view of mobile and stationary frames of the mobile bench depicted in FIGS. 12-16.

FIG. 19 is an exploded perspective view of a seat back of the mobile bench depicted in FIGS. 12-16

FIG. 20 is a perspective view of a mobile booth comprising two mobile benches as depicted in FIGS. 12-16 on opposite sides of a mobile table.

DETAILED DESCRIPTION OF THE INVENTION

Figure 2:
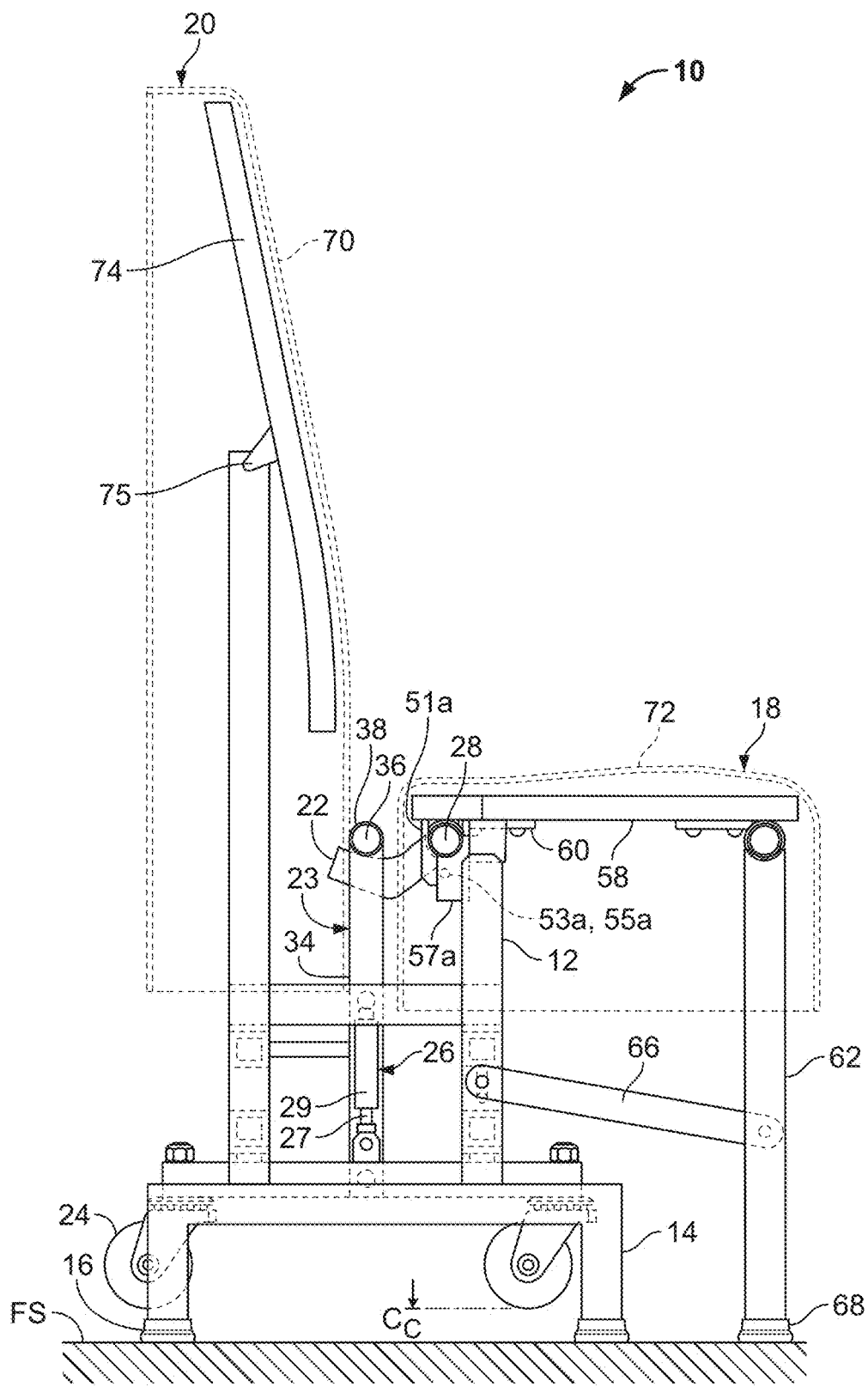
FIG. 2 is a side elevation view of the bench shown in FIG. 1 in an unfolded, stationary seating position, with the positions of seat back and seat shells depicted in phantom view.

With reference to the accompanying drawing figures, a mobile folding restaurant booth style bench according to the invention will now be described in detail. A mobile folding bench 10 according to the invention includes a mobile base embodied as a pair of caster frames 12a, 12b that engage a supporting floor surface FS when bench 10 is in a mobile, folded storage position, depicted in FIG. 1, to facilitate easy movement of bench 10 between a storage location and a use location. In addition, bench 10 includes a stationary base embodied as a footed stationary frame 14 that engages floor surface FS in an unfolded, seating position of bench 10 illustrated from the right side in FIG. 2. Notably, when in the seating position, bench 10 is solely supported by non-slip feet, including four non-slip feet 16 at four outwardly positioned corners of stationary frame 14 which bear most of the weight of bench 10, and two non-slip feet 68 of a pivoting seat front leg member 62 (discussed in more detail below), which serve primarily to bear a portion of the weight of any bench occupants and to prevent an occupied bench 10 from tipping forward, as best understood with reference to FIG. 2. Thus, during normal use, bench 10 is fully immobilized and stabilized against tipping. The use of the terms "stationary frame" and "caster frames" is merely intended to be descriptive of the skeletal aspect of the respective bases of the illustrated embodiments, which may be formed from steel tubing, for example, and not to limit the invention to exclude stationary or mobile bases having a bulk solid or shell geometry.

Illustrative linkage components and a sequence of folding bench 10 from the seating position to the folded position are shown in FIGS. 2-5. With reference to FIG. 2, a seat 18 of bench 10 is pivotally mounted to stationary frame 14, and a seat back 20 of bench 10 is fixedly mounted to stationary frame 14. The collective weight of seat 18 and seat back 20 is supported by stationary frame 14.

Mounting seat back 20 to stationary frame 14 has the benefit of maintaining a fixed relative height relationship between seat back 20 and seat 18, which is also connected to stationary frame 14. In addition, mounting seat back 20 to stationary frame 14 instead of to caster frames 12a, 12b allows caster frames 12a, 12b to be unattached to and independent of each other, allowing for independent suspension and thus smoother travel when moving bench 10 on casters 24. This arrangement also inhibits the possibility of sliding mechanisms locking up due to tilting of a unitary caster frame in response to unevenly applied forces when folding and unfolding bench 10.

Notwithstanding certain disadvantages mentioned above, seat back 20 could alternatively be attached to caster frames 12a, 12b. Although this would increase the amount of weight supported by caster frames 12a, 12b suspended above floor surface FS when bench 10 is in the seating position, it would in the same measure decrease the amount of force required from a suitable biasing component (described in more detail below as cylinder assembly 26) to support stationary frame 14 above floor surface FS. Thus, attaching seat back 20 to caster frames 12a, 12b instead of stationary frame 14 would have minimal if any net effect on the amount of effort required to deploy bench 10 in the seating position, which requires lifting the weight of caster frames 12a, 12b and opposing the biasing force tending to lift stationary frame 14. An engagement member 22 fixedly attached to seat 18 supports caster frames 12a, 12b suspended above floor surface FS, applying a lifting force to each of a pair of actuators 23 that are operatively connected to each caster frame 12a, 12b to maintain a clearance $C_C$ between casters 24 of caster frames 12a, 12b and floor surface FS.

A suitable biasing component is operatively connected between stationary frame 14 and caster frames 12a, 12b so as to bias stationary frame 14 in an upward direction relative to caster frames 12a, 12b. For example, the biasing component may be a compressed gas cylinder assembly 26, including a piston 27 connected to each caster frame 12a, 12b and a cylinder 29 connected to stationary frame 14, cylinder assembly 26 providing a biasing force tending to extend its length by forcing an increasing length of piston 27 out of cylinder 29. Other suitable biasing components (not shown) may include, without limitation, solid state compression, tension, or torsion springs (such as a torsion bar), or magnets.

Thus, to lift caster frames 12a, 12b from floor surface FS and lower stationary frame 14 into engagement with floor surface FS, engagement member 22 must bear the sum of the weight of caster frames 12a, 12b and the biasing force from cylinder assembly 26, in turn transmitting these forces through seat 18 to stationary frame 14. To retain bench 10 in this position, a sufficient moment must be applied to seat 18, supplied either by the weight of an occupant sitting on seat 18 or by a suitable resistance or locking mechanism (discussed in more detail below), to counterbalance the resultant moment about a seat pivot joint 28 produced by the downward force of actuators 23 on engagement member 22.

Figure 3:
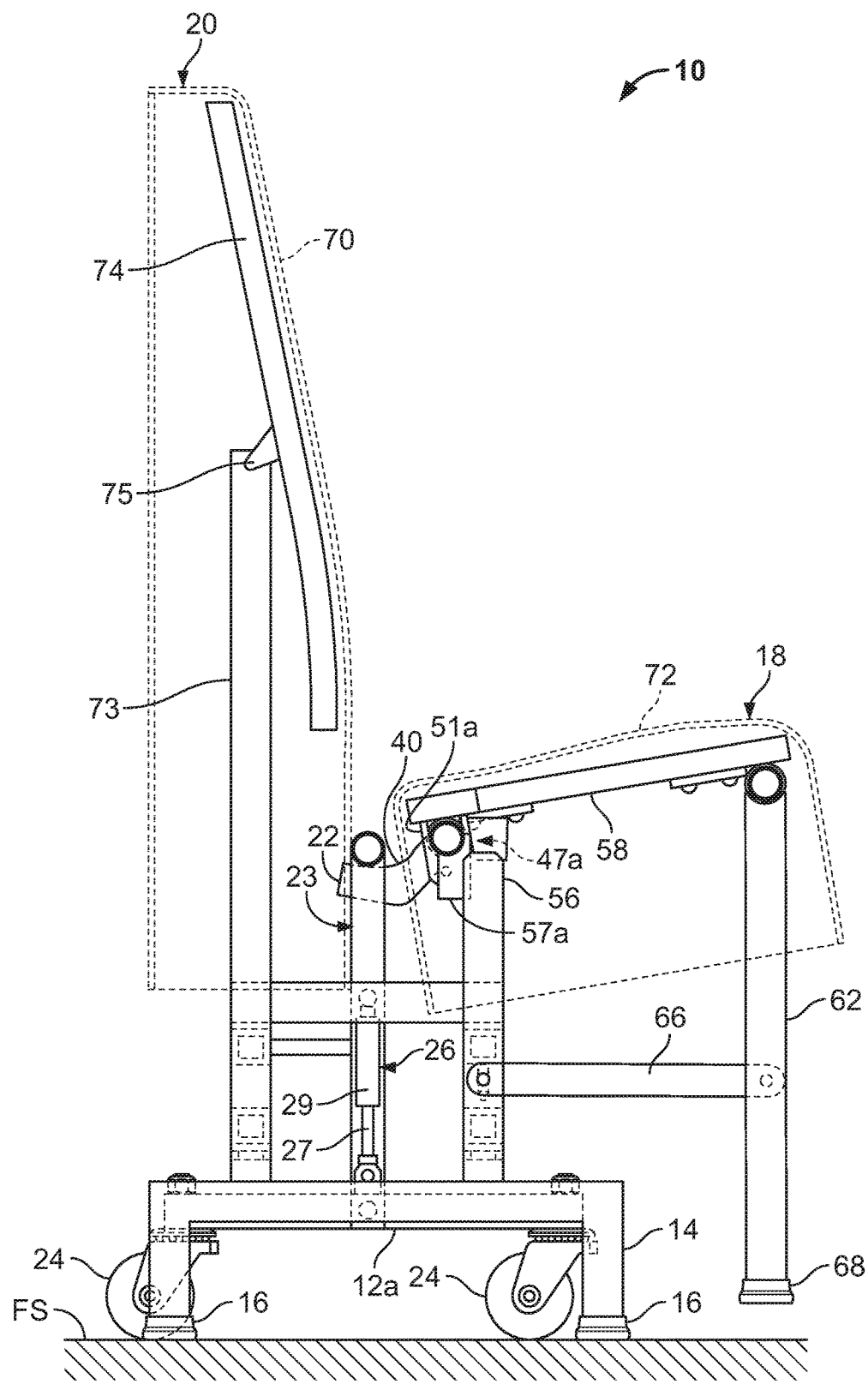
FIG. 3 is a side elevation view of the bench as shown in FIG. 2, in a partially folded position in which its mobile and stationary bases contact a supporting floor surface simultaneously.

Turning to FIG. 3, a partially folded intermediate position of bench 10 is depicted, in which seat 18 has been pivoted up, and thus engagement member 22 has been pivoted down, to permit the lowering of actuators 23 and caster frames 12a, 12b to a position in which the bottoms of casters 24 and feet 16 are aligned on the same horizontal plane, so that they contact floor surface FS simultaneously. Raising seat 18 further from this position shifts the weight of bench 10 fully onto casters 24, while lowering seat 18 further from this position shifts the weight of bench 10 back to feet 16.

Figure 4:
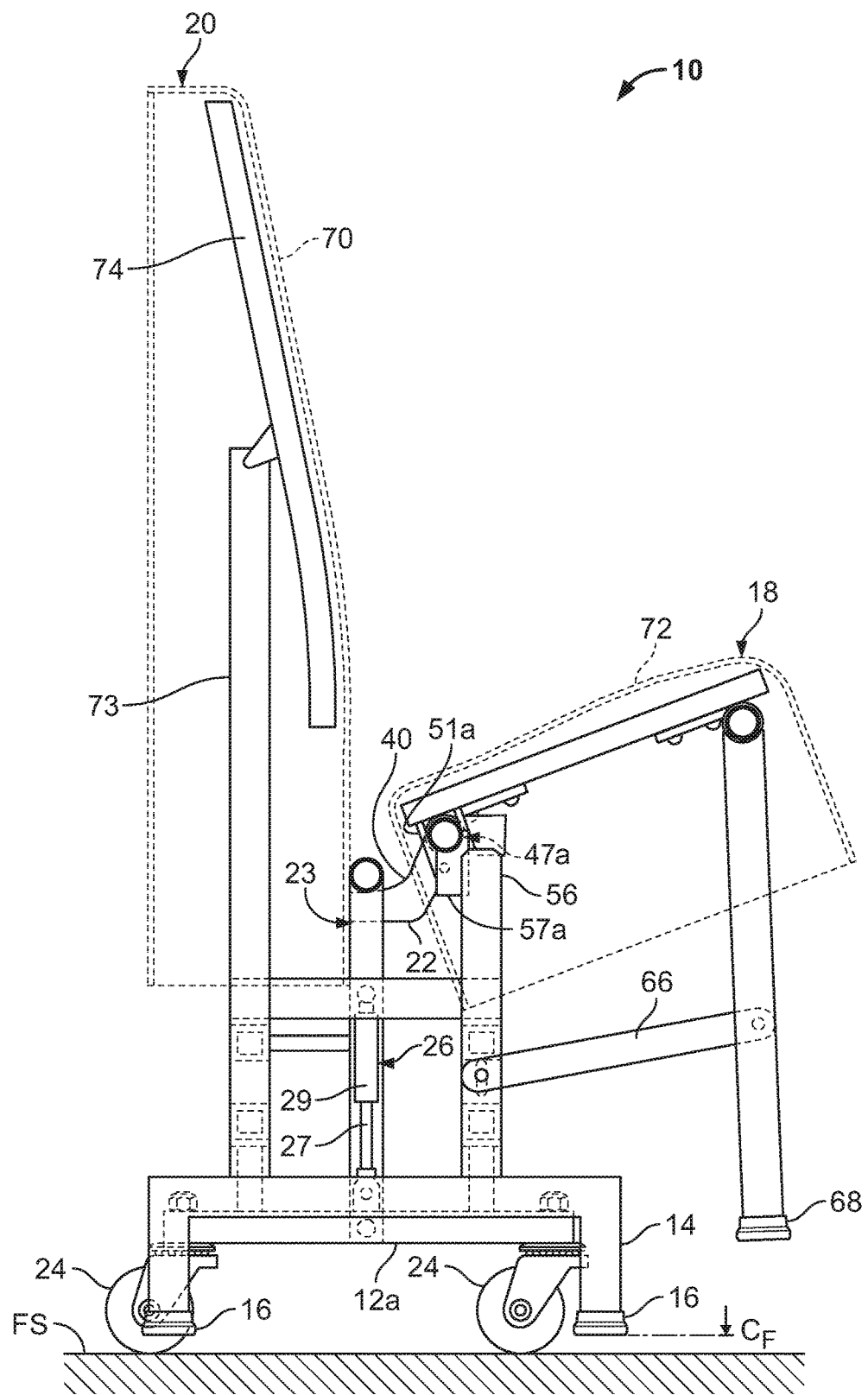
FIG. 4 is a side elevation view of the bench as shown in FIG. 2, in a partially folded position of initial engagement of an engagement member for shifting the bench from a mobile frame to a stationary frame.

Next, as seat 18 continues to be raised, a loss of engagement position (or initial engagement position for the reverse, lowering sequence of seat 18) of engagement member 22 and actuators 23 is reached, as shown in FIG. 4. In this position, engagement member 22 and actuators 23 are touching, but no force is transmitted between them. This initial engagement/loss of engagement position corresponds to the maximum extension of cylinder assembly 26 and thus the highest position to which it can lift stationary frame 14 above caster frames 12a, 12b. This highest position may, for example, be the position at which a variable biasing force equals the combined weight of stationary frame 14 and its attached components. In that case, the biasing force would be initially larger than the combined weight of frame 14 when seat 18 is fully unfolded, and would be reduced to a force equal to said combined weight as cylinder assembly 26 extended.

More preferably, the highest position of the stationary frame is a fixed position in which a member or component of bench 10 meets an obstruction, which may correspond to piston 27 reaching the end of its travel or some other stop member abutting against a stop surface. This allows the biasing force to be substantially greater than the weight it supports throughout the relative movement of caster frames 12a, 12b and stationary frame 14, providing fast lift assist action, without overshooting the desired highest position of stationary frame 14. In the illustrated example, a stop pin 30 travels up and down with each caster frame 12a, 12b, within a slot 32 formed in stationary frame 14. When stop pin 30 reaches a bottom end 33 of slot 32, as seen in FIG. 1, stationary frame 14 can be raised no higher and cylinder assembly 26 can extend no farther. The highest position of stationary frame 14 should be established so that engagement member 22 and actuators 23 are relatively positioned for effective force transmission at the initial engagement position, as also mentioned below.

Figure 5:
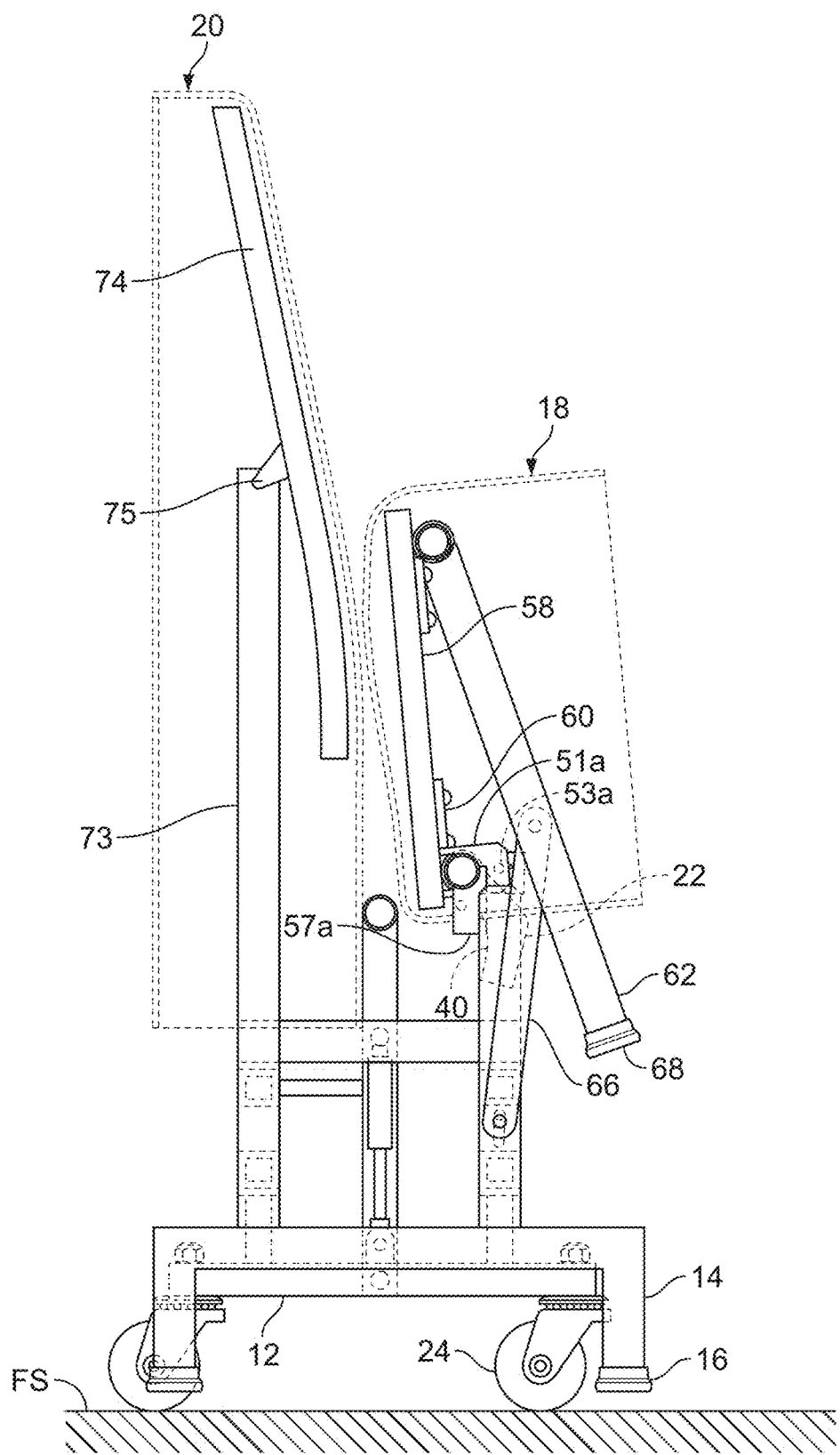
FIG. 5 is a side elevation view of the bench as shown in FIG. 2, in the mobile, folded storage position shown in FIG. 1.

Continuing to pivot seat 18 upward from the loss of engagement/initial engagement position shown in FIG. 4 to an approximately vertical orientation produces the folded position of bench 10 shown in FIG. 5, in which a clearance $C_F$ is maintained between feet 16 and floor surface FS. As noted above, in this position stationary frame 14 floats above caster frames 12a, 12b on cylinder assembly 26. An ancillary benefit provided by this arrangement is shock absorption; that is, if casters 24 roll over a bump (such as a doorway threshold) while a human user is transporting bench 10 in the folded position, the shock of the bump will be absorbed by a slight compression of cylinder assembly 26, reducing any jolt felt by the user.

Figure 7:
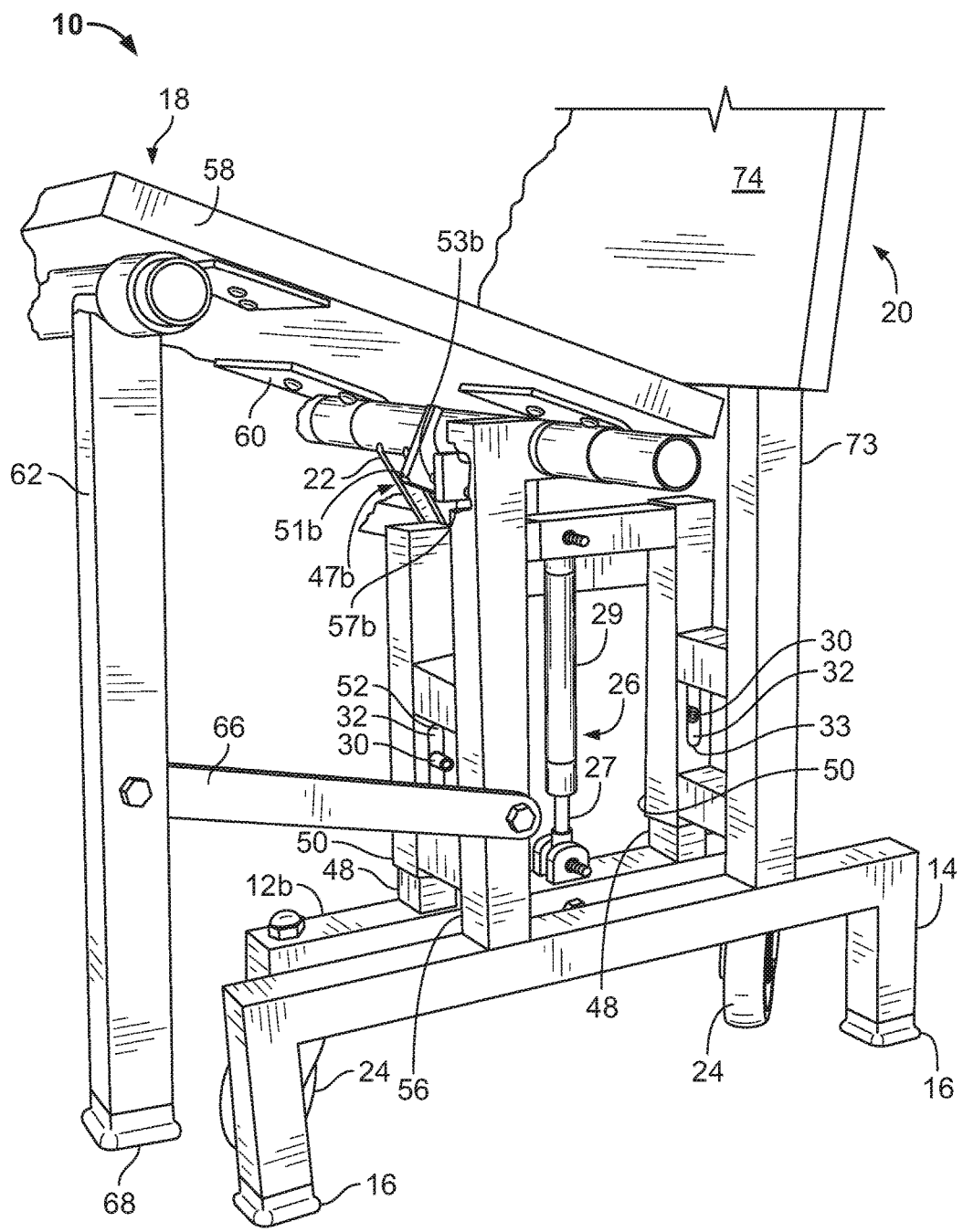
FIG. 7 is a fragmentary perspective view of the left side of the bench shown in FIG. 1, in a partially folded position.
Figure 8:
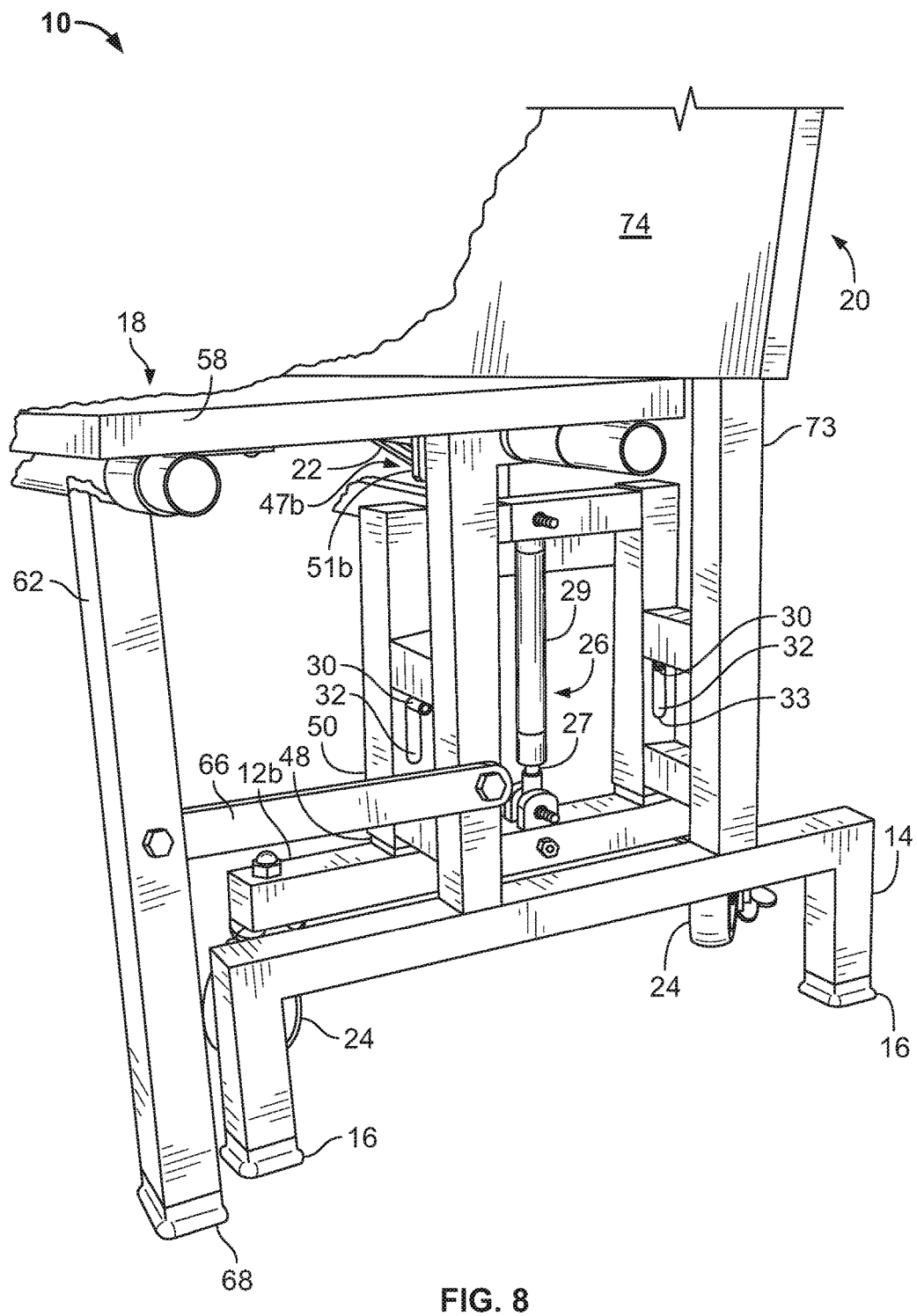
FIG. 8 is a fragmentary perspective view of the bench as shown in FIG. 7, in a stationary, unfolded seating position.

Additional components and features supporting the folding of bench 10 between its seating and folded positions will now be described with reference to FIGS. 1, 7, and 8.

As best shown in FIG. 1, each actuator 23 comprises an actuator column 34 connected at its lower end to the respective caster frame 12a, 12b, a lift bar 36 integral to and extending horizontally from actuator column 34, and a low friction contact bushing 38 rotatably mounted on lift bar 36. Thus, as engagement member 22 pivots between the loss of engagement/initial engagement position and the seating position, and the point of contact between engagement member 22 and bushing 38 shifts with respect to engagement member 22, bushing 38 slidingly rotates around lift bar 36. Bushing 38 thus prevents rubbing and wear between engagement member 22 and lift bar 36. Also, it will be noted that engagement member 22 comprises a curved contact region 40 providing contact with bushing 38 throughout the engaged range of motion. The upward concavity of contact region 40 helps to maintain approximately vertical transmission of force to actuators 23 throughout the pivoting of engagement member 22.

In alternative embodiments in which a contact region of an engagement member instead includes a contact region with a straight profile (not shown), the direction of a normal (perpendicular) contact force transmitted from the engagement member would inevitably deviate from vertical to some degree. The size of the angle by which the force transmission direction would deviate from vertical for a straight-profile contact region may be limited by appropriately establishing its initial angle (for example by adjusting parameters including the size, shape, and attachment location of the engagement member and/or setting the maximum height to which stationary frame 14 is raised in one of the ways described above) and limiting the angular range of motion of the engagement member through which it remains in contact with actuators 23.

In other embodiments, different force transmission components, such as pneumatics, hydraulics, magnets, or rack-and-pinion gear assemblies, for example, may be employed in lieu of a sliding normal contact engagement member to convert pivotal movement of seat 18 into relative vertical movement of caster frames 12a, 12b and stationary frame 14, which may inherently avoid the problem of a varying direction of force transmission. In such embodiments, the alternative force transmission components may also be configured so that seat 18 can transmit force and movement to the frames not only when pivoting down (forcing stationary frame 14 down and caster frames 12a, 12b up), but also when pivoting up (forcing caster frames 12a, 12b down and stationary frame 14 up). A mechanism in which upward pivoting of the seat is converted to upward vertical movement of the stationary frame could substitute for a base biasing component, as the force required to raise the stationary frame could instead be provided by a user in folding the seat, and the bench could be retained in the folded position by a suitable locking mechanism, which may be similar to locking mechanisms discussed below for retaining the bench in the unfolded seating position. Alternatively, a biasing component may nonetheless be used to assist a user in raising the stationary frame, but need not provide a force equal to the entire weight of the stationary frame and its attached components if a lifting force is transmitted to the stationary frame by folding the seat.

Optionally, as in the illustrated embodiment, each actuator column 34 may be connected to the respective caster frame 12a, 12b by a pivotal joint 44, and slidingly retained in a sliding collar 46 fixed with respect to stationary frame 14, collar 46 allowing column 34 some clearance to pivot but retaining column 34 in an approximately upright orientation. This connection arrangement of actuator column 34 permits column 34 to seek an angle in which the force transmission direction from engagement member 22 to actuators 23 is generally aligned with column 34, to inhibit possible fatigue of column 34 due to repetitive bending stresses.

In the illustrated embodiment, stationary frame 14 is constrained solely to vertical sliding movement relative to caster frames 12a, 12b. This vertical sliding connection between caster frames 12a, 12b and stationary frame 14 is provided by smaller perimeter uprights 48 of caster frames 12a, 12b slidingly inserted into larger perimeter uprights 50 of stationary frame 14, uprights 48 carrying one or more of the aforementioned stop pin 30 and uprights 50 having a corresponding one or more of the aforementioned slot 32 formed therein. As shown in the drawings, particularly FIG. 1, each of four uprights 48 carries a stop pin 30, and each of four uprights 50 includes a corresponding slot 32.

As mentioned above, when bench 10 is in the seating position, a suitable locking mechanism may be employed to oppose or resist the tendency of cylinder assembly 26 to extend, thereby forcing seat 18 to pivot upward and lifting stationary frame 14 off of floor surface FS. A passive locking mechanism is preferred, being capable of providing sufficient resistance to maintain bench 10 in the seating position, but also capable of being disengaged by a sufficient lifting force applied to seat 18 without harming any components or requiring a separate action by a human operator, such as pulling out a pin or sliding a bolt before lifting. In addition, the passive locking mechanism preferably engages automatically when seat 18 is lowered to the seating position, without requiring an additional action such as inserting a pin or sliding a bolt. One such passive locking mechanism is a spring loaded ball detent locking mechanism 47a, 47b, best shown in FIGS. 1, 7, and 8. Detent locking mechanism 47a, 47b includes a spring loaded ball component 53a, 53b attached to a plate 51a, 51b carried by seat 18, which snaps into a recess 55a, 55b formed in a plate 57a, 57b carried by stationary frame 14 when bench 10 is in the seating position, requiring a threshold lifting torque on seat 18 greater than that provided by cylinder assembly 26 to dislodge or pop ball component 53a, 53b out of engagement with recess 55a, 55b. Plate 51a having attached ball component 53a is shown in greater detail in FIG. 1A, and plate 57a having recess 55a formed therein is shown in greater detail in FIG. 1B.

Certain features and components of bench 10 serve to prevent over-travel of seat 18 in the downward pivoting direction past its generally horizontal orientation in the seating position. Thus, it will be noted that slot 32 has an upper end 52 in addition to bottom end 33 already mentioned. Upper end 52 limits the upward travel of the respective caster frame 12a, 12b, thus preventing downward pivoting over-travel of seat 18 from pivoting downward past its generally horizontal orientation in the seating position. Additionally, a generally flat top surface 54 of an upright 56 of stationary frame 14, to which seat 18 is pivotally connected, abuts a flat bottom surface of panel 58 when seat 18 is in the seating position, also preventing downward pivoting over-travel of seat 18. Finally, detent locking mechanism 47a, 47b may provide yet another redundant safeguard against downward over-travel of seat 18, should the others fail.

Notwithstanding the foregoing stop mechanisms, it may be desirable to provide front legs to support seat 18, to enhance stability against forward tipping of bench 10 while also preventing undue bending stresses on a seat base panel 58 and/or shear stresses on hinge mounting plates 60 or other connections between seat base panel 58 and stationary frame 14 by bracing the front end of seat base panel 58 against floor surface FS. Thus, a pivoting seat front leg member 62 comprising a pair of seat front legs 64 is provided in the illustrated embodiment. A pair of guide links 66 are pivotally connected between each front leg 64 and the corresponding adjacent upright 56 of stationary frame 14, to facilitate compact retention of leg member 62 in the folded position of bench 10 and to align each front leg 64 vertically in the seating position. Similarly to stationary frame 14, front leg member 62 is provided with non-slip feet 68 to further inhibit sliding on floor surface FS.

Figure 9:
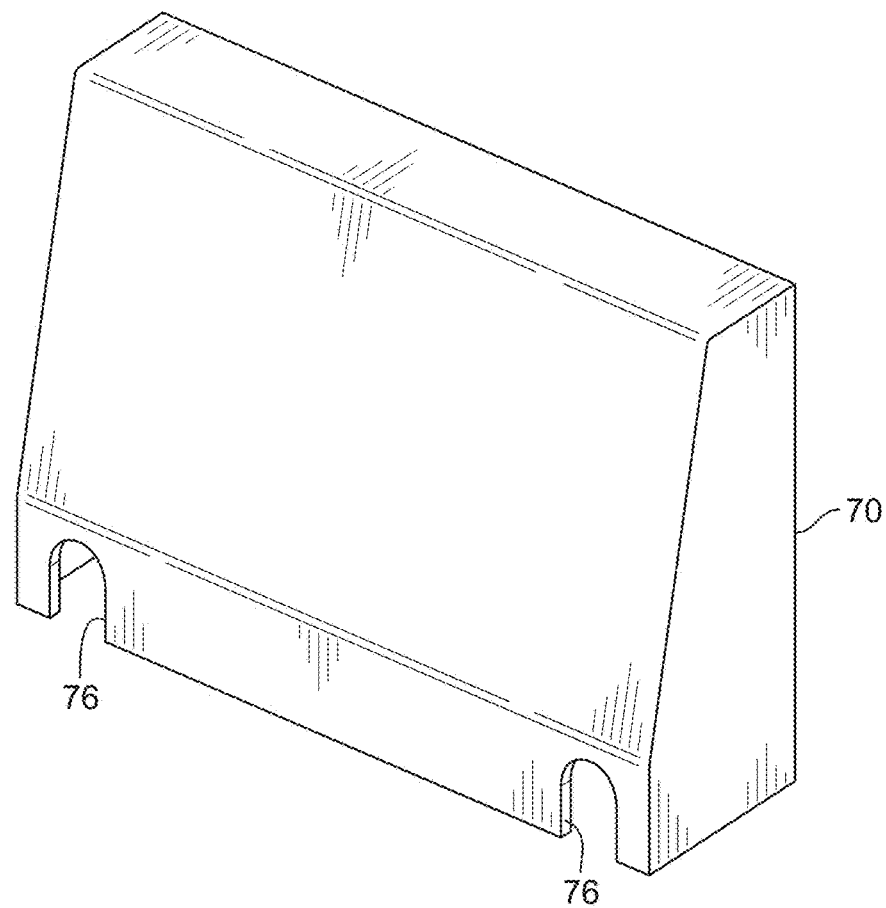
FIG. 9 is a perspective view of a seat back shell for use in a mobile folding bench according to an aspect of the invention.
Figure 10:
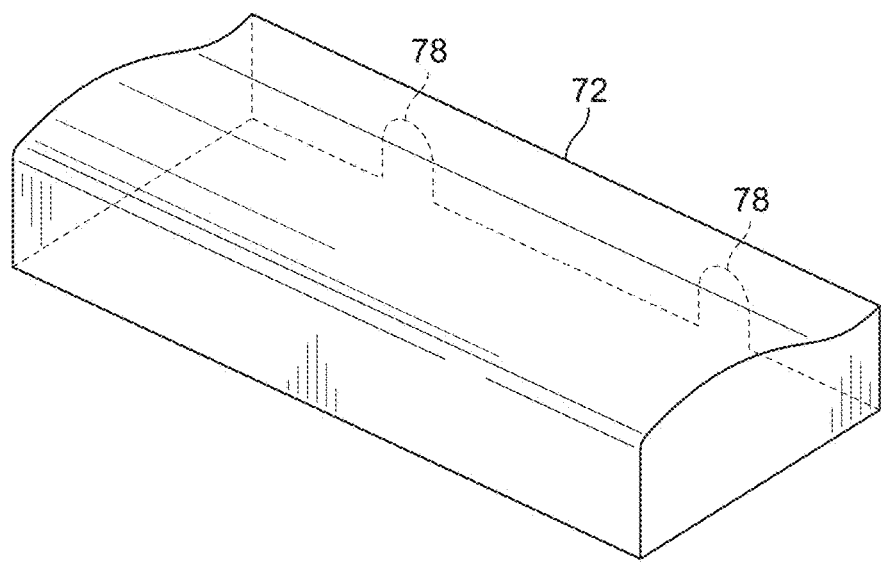
FIG. 10 is a perspective view of a seat shell for use in a mobile folding bench according to an aspect of the invention.

In addition to the components described in the above paragraphs, bench 10 may incorporate any suitable combination of panels, contoured shells, cushions or other appropriate seat cover structure to promote ergonomics, comfort, and/or aesthetic appeal. For example, as illustrated in FIGS. 2-5, seat back 20 may include a seat back shell 70, as depicted in FIG. 9, and seat 18 may include a seat shell 72, as depicted in FIG. 10. Seat back shell 70 and seat shell 72 may be formed from any suitable material, such as plastic, wood, or fiberglass. Seat shell 72 may be attached to seat base panel 58 in any suitable manner or may be integral thereto. Similarly, seat back shell 70 may be fixedly attached by any suitable connecting structure (not shown) to a seat back base panel 74 or may be integral thereto. In turn, seat back base panel 74 is attached to rear uprights 73 of stationary frame 14 by a suitable joint 75. In the embodiment depicted as bench 10 having seat back shell 70 and seat shell 72, joint 75 is preferably a fixed joint. For aesthetic and safety purposes, it may be desirable to substantially conceal and/or cover at least a substantial portion of engagement member 22 and/or actuators 23 inside seat back shell 70 and/or seat shell 72. Thus, notches 76 (shown in FIG. 9) are preferably provided in a bottom front edge of seat back shell 70, and notches 78 (shown in FIG. 10) in a bottom rear edge of seat shell 72, to permit protrusion of some portion of engagement member 22 into the interior of seat back shell 70 when bench 10 is in the seating position, as illustrated in FIG. 2.

Figure 6:
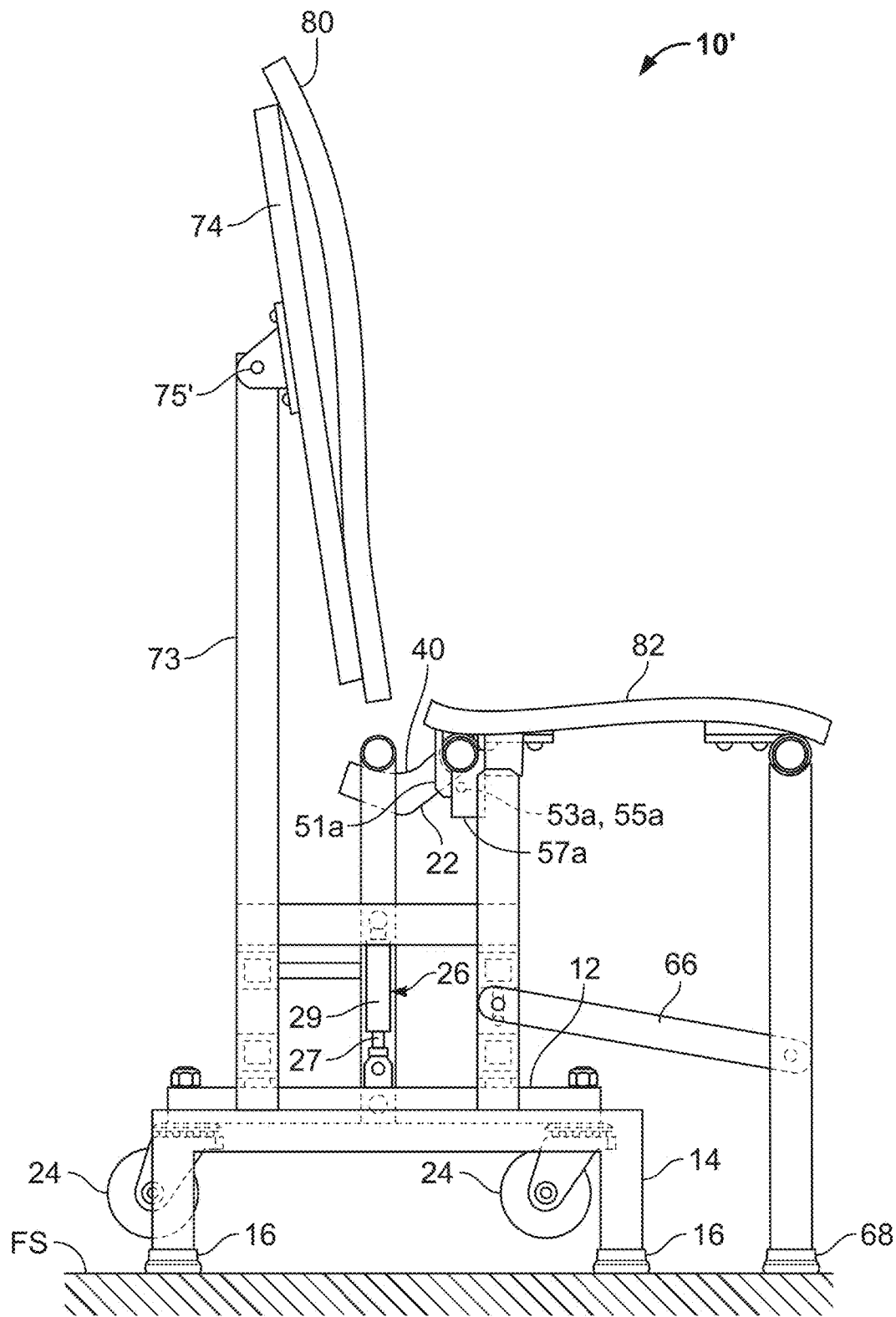
FIG. 6 is a side elevation view of an alternative embodiment of a mobile folding bench according to an aspect of the invention, in a stationary, unfolded seating position.

In another embodiment depicted in FIG. 6, a bench 10' includes an alternative seat back 20' accommodated with a generally flat, contoured seat back panel 80 attached in a suitable manner to seat back base panel 74, and an alternative seat 18', which may comprise a contoured seat panel 82. In bench 10', seat back base panel 74 is attached to rear upright 73 by a joint 75' which may be a fixed or adjustable pivot joint, in the latter case preferably providing friction or locking means to retain base panel 74 at a selected angle. Seat panel 82 may attach directly to front leg member 62 and stationary frame uprights 56 as shown in the drawing, or it may attach in a suitable manner to a seat base panel similar to seat base panel 58.

Figure 11:
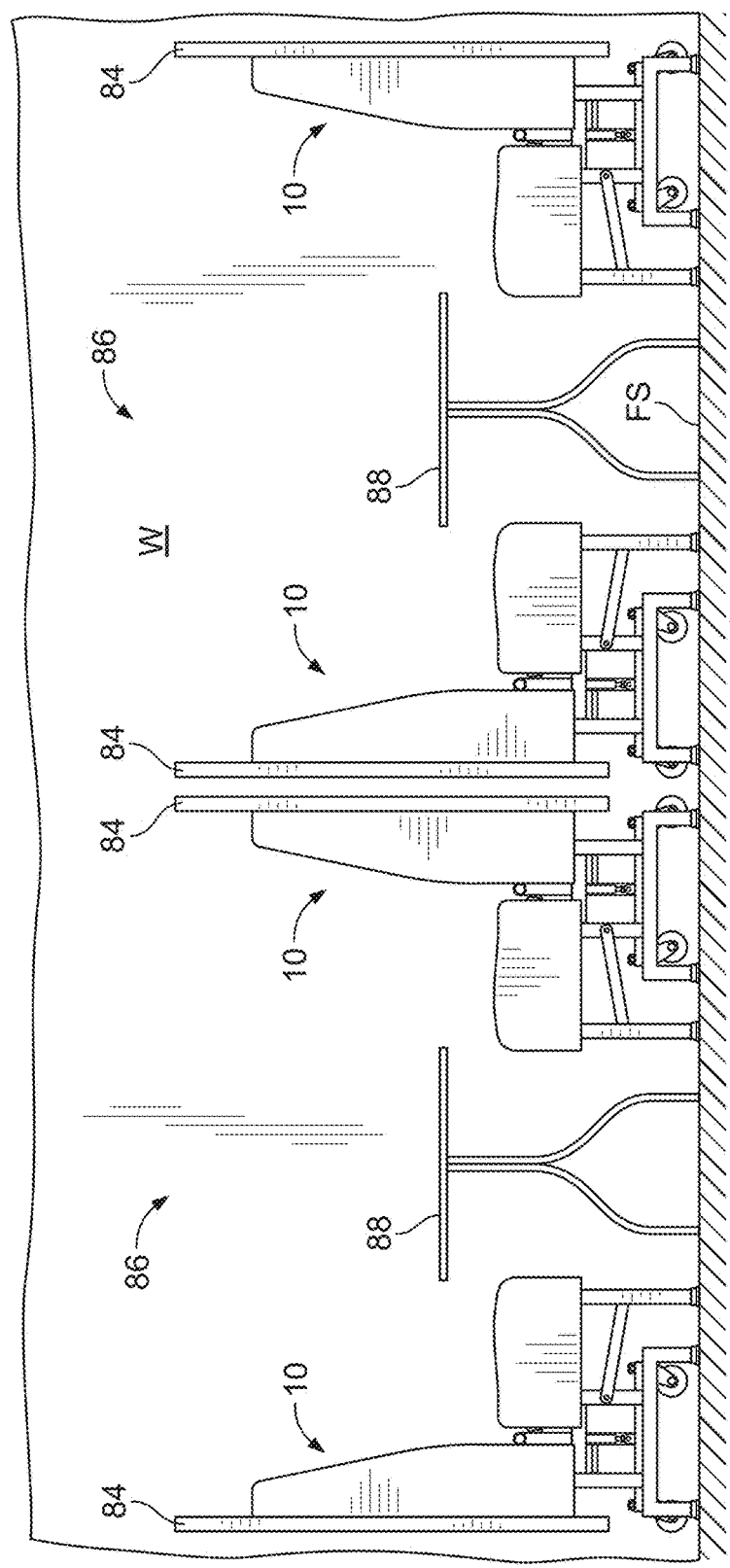
FIG. 11 is a side elevation view of four mobile folding benches arranged around two tables to form a pair of adjacent restaurant style booths according to another aspect of the invention.
Figure 12:
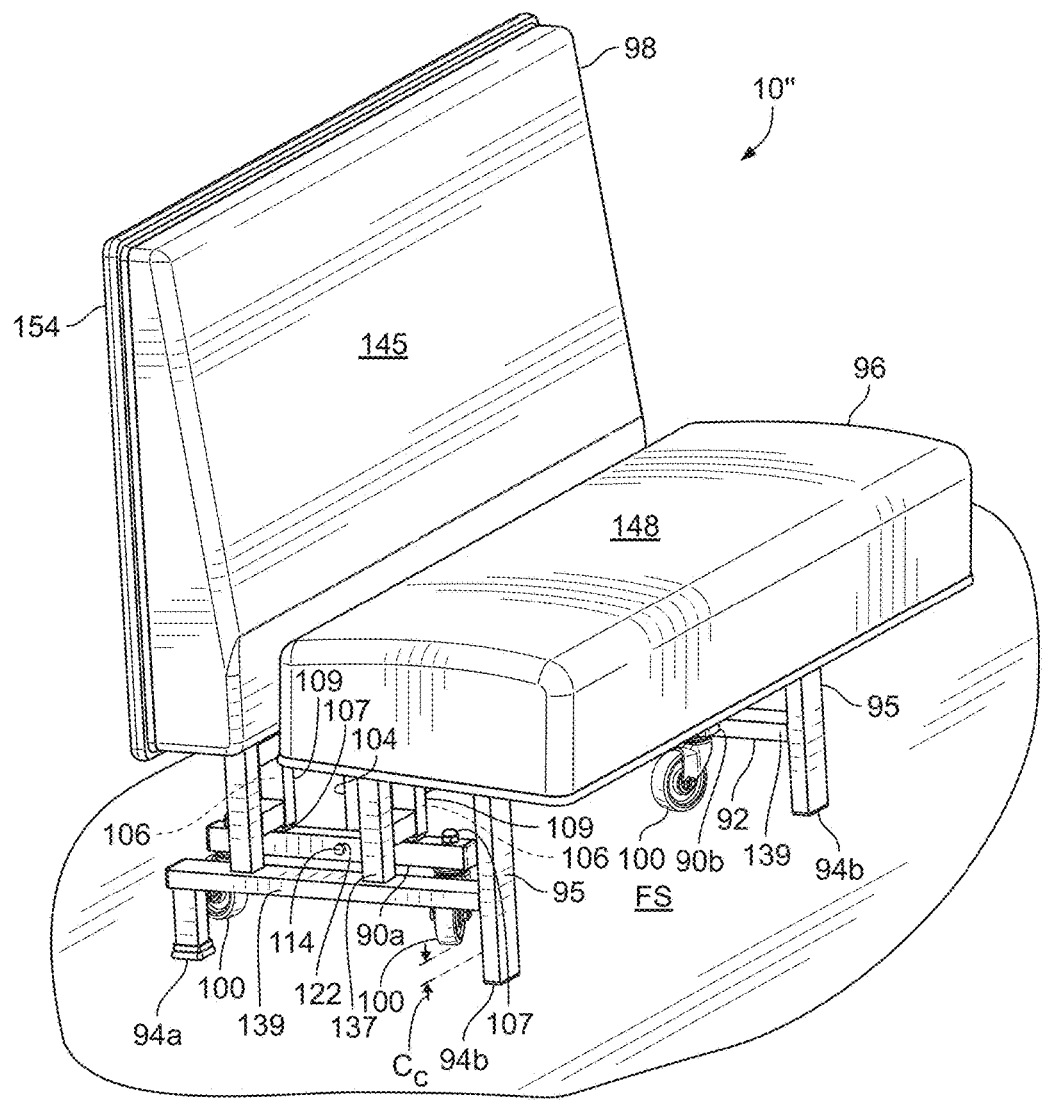
FIG. 12 is a perspective view of a fixed-leg mobile bench according to another aspect of the invention, in a seating position.
Figure 15:
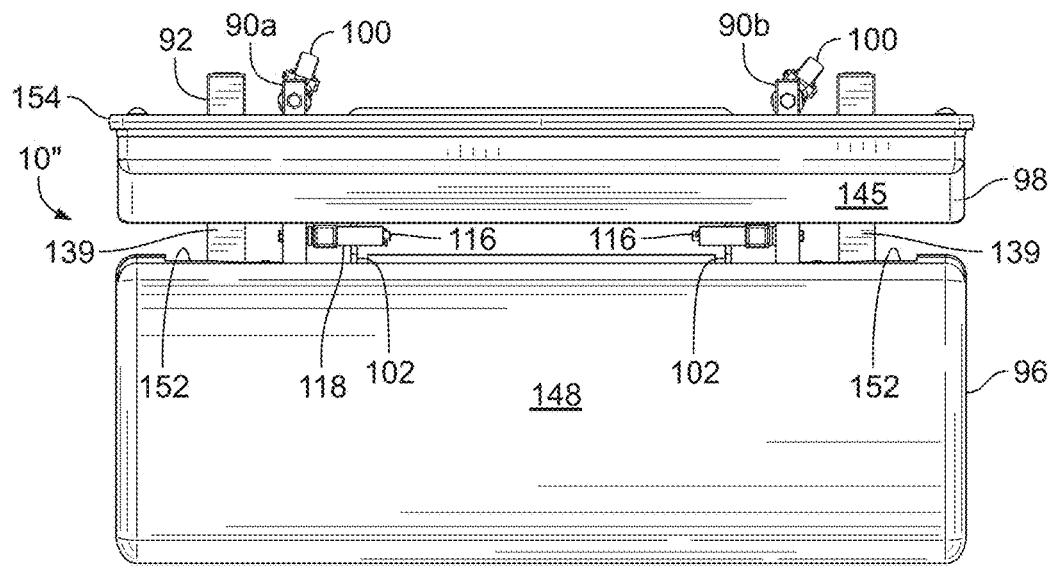
FIG. 15 is a top plan view of the mobile bench of FIG. 12, in the seating position.
Figure 16:
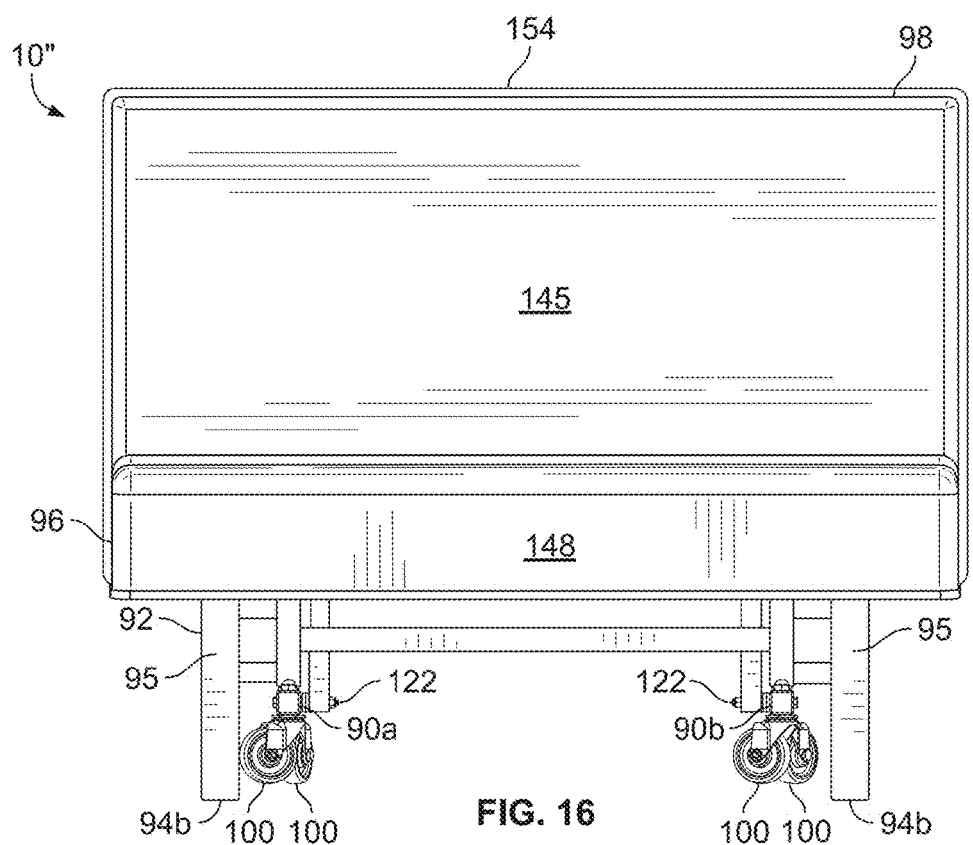
FIG. 16 is a front elevation view of the mobile bench of FIG. 12, in the seating position.

Finally, a privacy panel 84 is preferably provided to separate the seating space provided by one booth from that of adjacent booths and/or from common spaces or walking areas. In addition, a portion of privacy panel 84 extending above seat back shell 70 can be advantageously used to display printed designs, such as a school emblem or a restaurant logo. Thus, illustrated in FIG. 11 is an example arrangement of two booths 86 arranged back-to-back adjacent a wall W, each booth 86 defined by a pair of benches 10 as previously described, facing opposite sides of a table 88.

Turning to FIGS. 12-20, in accordance with another embodiment, a fixed-leg bench 10" will now be described. Fixed-leg bench 10" includes a mobile base embodied as caster frames 90a, 90b that engages a supporting floor surface FS when bench 10" is in a mobile, folded storage position, depicted in FIG. 13, to facilitate easy movement of bench 10" between a storage location and a use location. In addition, bench 10" includes a stationary base embodied as a footed stationary frame 92 that engages floor surface FS in an unfolded, seating position of bench 10" illustrated from the right side in FIG. 14.

When in the seating position, bench 10" is solely supported, at four outwardly positioned corners of stationary frame 92, by rear non-slip feet 94a and front non-slip feet 94b. Bench 10" differs from benches 10 and 10' described above primarily in this regard; that is, instead of a pivoting seat front leg member 62, bench 10" employs the front two corner uprights of stationary frame 92 as fixed legs 95 having non-slip feet 94b at their lower ends. Preferably, fixed legs 95 are positioned sufficiently forwardly with respect to a seat 96 to prevent forward tipping during normal seating use of bench 10", but without excessively expanding the depth dimension of bench 10" in the folded mobile storage position.

Seat 96 of bench 10" is pivotally mounted to stationary frame 92, and a seat back 98 of bench 10" is fixedly mounted to stationary frame 92. The collective weight of seat 96 and seat back 98 is supported at all times by stationary frame 92. When seat 96 of bench 10" is rotated to a seating position, a pair of engagement members 102, which are fixedly attached to seat 96, support caster frames 90a, 90b suspended above floor surface FS by applying a lifting force to a pair of actuators 104 that are operatively connected to caster frames 90a, 90b. This maintains a clearance $C_C$ between casters 100 of caster frames 90a, 90b and floor surface FS.

Figure 17A:
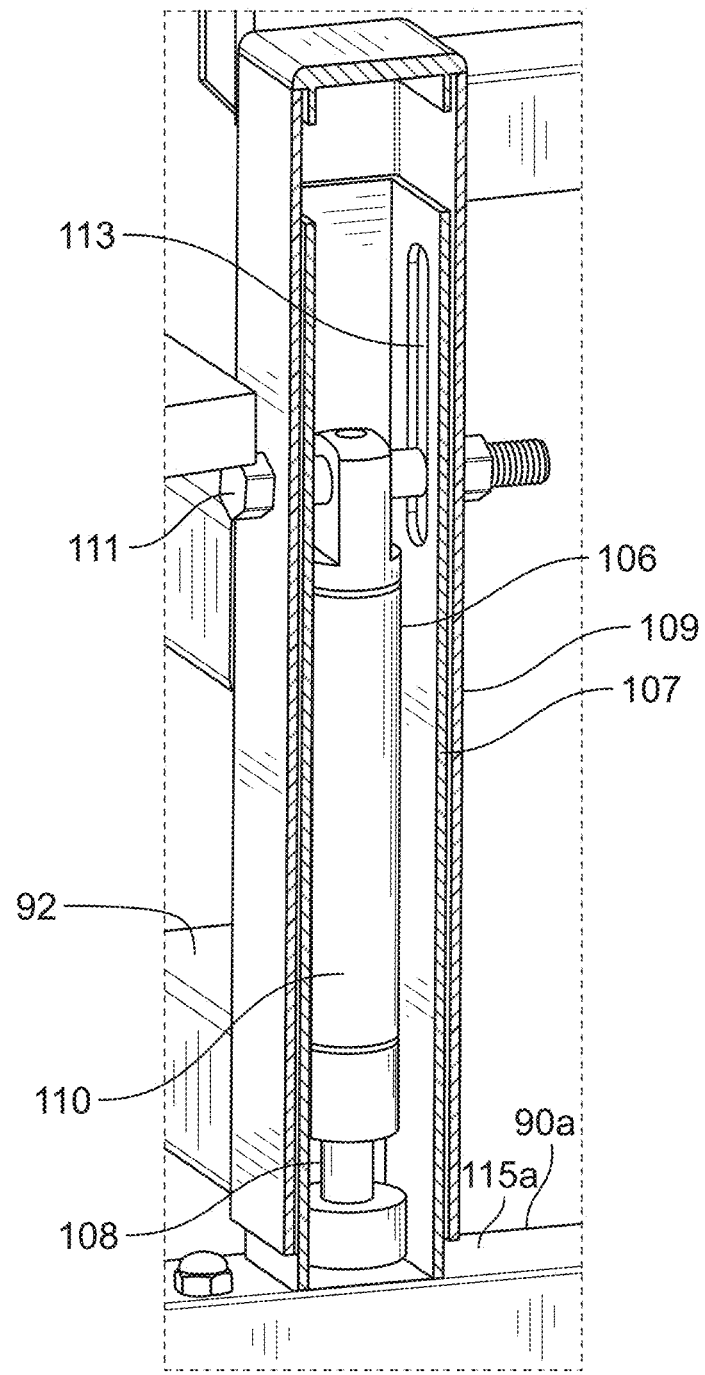
FIG. 17A is a partial cutaway perspective view of slidingly mated uprights of a mobile and stationary frames shown in FIG. 17, respectively, housing a piston-cylinder assembly.

As in bench 10 and bench 10', a suitable biasing component is operatively connected between stationary frame 92 and caster frames 90a, 90b of bench 10" so as to bias stationary frame 92 in an upward direction relative to caster frames 90a, 90b. In particular, bench 10" is shown to include four compressed gas cylinder assemblies 106. Locations of the four gas cylinder assemblies 106, each housed within a pair of slidingly mated tube uprights 107, 109 of caster frames 90a, 90b and stationary frame 92, respectively, are indicated in FIG. 17. A partial cutaway view of tube uprights 107, 109 is shown in FIG. 17A, revealing components of the respective gas cylinder assembly 106, namely, a piston 108 connected to caster frames 90a, 90b and a cylinder 110 connected to stationary frame 92. Each cylinder assembly 106 provides a biasing force tending to extend its length by forcing an increasing length of piston 108 out of cylinder 110. With reference to FIG. 17A, cylinder 110 is connected to a bolt 111 affixed to tube upright 109 of fixed frame 92, and a lower end of piston 108 abuts a caster beam 115a of caster frame 90a. Bolt 111 is slidingly retained in a slot 113 formed in inner tube upright 107 of caster frame 90a, thus permitting vertical movement of tube upright 107 and tube upright 109 relative to each other. Optionally, the length of slot 113 may serve to define one or both limits of a relative range of motion permitted between tube uprights 107, 109. Alternatively, slot 113 may extend beyond limits set by other mechanical relationships within bench 10". For example, as in the illustrated embodiment of bench 10" as discussed further below, seat 96 in the seating position may abut an upwardly facing surface, preventing further downward pivoting of seat 96, or a bottom face of tube upright 109 may abut caster beam 115a of caster frame 90a, to prevent further downward travel of bolt 111 in slot 113 before bolt 111 reaches the bottom of slot 113. Likewise, an internal stop (not shown) of cylinder assembly 106, the weight of stationary frame 92 equaling or surpassing the extension force of cylinder assembly 106, or some other stop mechanism, may prevent further upward travel of bolt 111 in slot 113 before bolt 111 reaches the top of slot 113. As with benches 10, 10', other suitable biasing components (not shown) may include, without limitation, solid state compression, tension, or torsion springs (such as a torsion bar), or magnets.

Thus, to lift caster frames 90a, 90b from floor surface FS and lower stationary frame 92 into engagement with floor surface FS, engagement members 102 must bear the sum of the weight of caster frames 90a, 90b and the total biasing force from cylinder assemblies 106, in turn transmitting these forces through seat 96 to stationary frame 92. As with benches 10, 10', to retain bench 10" in this position, a sufficient moment must be applied to seat 96, supplied either by the weight of an occupant sitting on seat 96 or by a suitable resistance or locking mechanism, to counterbalance the resultant moment about a seat pivot joint 112 (FIG. 17) produced by the downward force of actuators 104 on engagement members 102.

One skilled in the art will understand that a partially-folded weight-shifting position of bench 10", in which casters 100 and non-slip feet 94a, 94b contact floor surface FS simultaneously, and a partially folded engagement/loss-of-engagement position, in which engagement members 102 gain and lose contact with actuators 104, substantially resemble those positions of bench 10, depicted in FIGS. 3 and 4. Seat front pivoting leg member 62 and guide links 66 of bench 10 do not transmit any forces or relative motion between stationary frame 14 and caster frame 12, and thus their omission in bench 10" does not affect the stages of shifting the weight of bench 10" between caster frames 90a, 90b and stationary frame 92.

Thus, bench 10" is depicted only in a fully unfolded seating orientation (FIGS. 12, 14-16, 20) and a fully folded mobile storage orientation (FIG. 13). In the folded position of bench 10" shown in FIG. 13, a clearance $C_F$ is maintained between feet 94a, 94b and floor surface FS. As noted above, in this position stationary frame 92 floats above caster frames 90a, 90b on cylinder assemblies 106.

Additional components and features supporting the folding of bench 10" between its seating and folded positions will now be described with reference to FIG. 17. Each actuator 104 comprises an actuator column 114 connected at its lower end to a respective caster frame 90a, 90b, a lift bar 116 extending horizontally in a medial direction from the upper end of actuator column 114, a low friction contact bushing 118 rotatably mounted on lift bar 116 to engage a respective engagement member 102. Thus, as engagement members 102 pivot between the initial engagement position and the seating position, and the point of contact between engagement members 102 and bushings 118 shifts with respect to engagement members 102, bushings 118 slidingly rotate around lift bar 116. Bushings 118 thus prevent rubbing and wear between engagement members 102 and lift bar 116. Also, it will be noted that engagement members 102 comprise a curved contact region 120 providing contact with bushings 118 throughout the engaged range of motion. The upward concavity of contact region 120 helps to maintain approximately vertical transmission of force to actuators 104 throughout the pivoting of the respective engagement member 102. Also, as noted above for bench 10, different force transmission components, such as pneumatics, hydraulics, magnets, or rack-and-pinion gear assemblies, for example, may be employed in lieu of a sliding normal contact engagement member to convert pivotal movement of seat 96 into relative vertical movement of caster frames 90a, 90b and stationary frame 92, which may inherently avoid any potential problems associated with a varying direction of force transmission.

Optionally, as in the illustrated embodiment, each actuator column 114 may be connected to caster frames 90a, 90b by a pivotal joint 122, and slidingly retained in a sliding collar 124 fixed with respect to stationary frame 92, collar 124 allowing column 114 some clearance to pivot but retaining column 114 in an approximately upright orientation. This connection arrangement of actuator column 114 permits column 114 to seek an angle in which the force transmission direction from engagement members 102 to actuators 104 is generally aligned with column 114, to inhibit possible fatigue of column 114 due to repetitive bending stresses.

In the illustrated embodiment, stationary frame 92 is constrained solely to vertical sliding movement relative to caster frames 90a, 90b. This vertical sliding connection between caster frames 90a, 90b and stationary frame 92 is provided by smaller perimeter uprights 107 of caster frames 90a, 90b slidingly inserted into larger perimeter uprights 109 of stationary frame 92.

As mentioned above, when bench 10" is in the seating position, a suitable locking mechanism may be employed to oppose or resist the tendency of cylinder assemblies 106 to extend, thereby forcing seat 96 to pivot upward and lifting stationary frame 92 off of floor surface FS. A passive locking mechanism is preferred, being capable of providing sufficient resistance to maintain bench 10" in the seating position, but also capable of being disengaged by a sufficient lifting force applied to seat 96 without harming any components or requiring a separate action by a human operator, such as pulling out a pin or sliding a bolt before lifting. In addition, the passive locking mechanism preferably engages automatically when seat 96 is lowered to the seating position, without requiring an additional action such as inserting a pin or sliding a bolt. One such passive locking mechanism is a spring loaded ball detent locking mechanism 126a, 126b substantially resembling detent locking mechanism 47a, 47b described above for bench 10.

Stationary frame 92 includes a pair of seat leg beams 135 extending forwardly from a pair of uprights 137 of stationary frame 92 to the upper ends of fixed legs 95. Seat leg beams 135 are integrally attached to respective upper ends of fixed legs 95, which in turn are also attached near their lower ends to a pair of leg beams 139. Seat leg beams 135, thus supported on floor surface FS by stationary frame 92 and fixed legs 95, serve to brace seat 96 in its generally horizontal seating position. In particular, a generally flat top surface 136 of seat leg beams 135 abuts a flat bottom surface of a seat base panel 141 of seat 96 when seat 96 is in the seating position, to support the weight of seat 96 and any occupants, and to prevent over-travel thereof in a downward pivoting direction. Preferably, seat base panel 141 is reinforced at the location of abutment against seat leg beams 135, such as by plates 143.

Figure 17B:
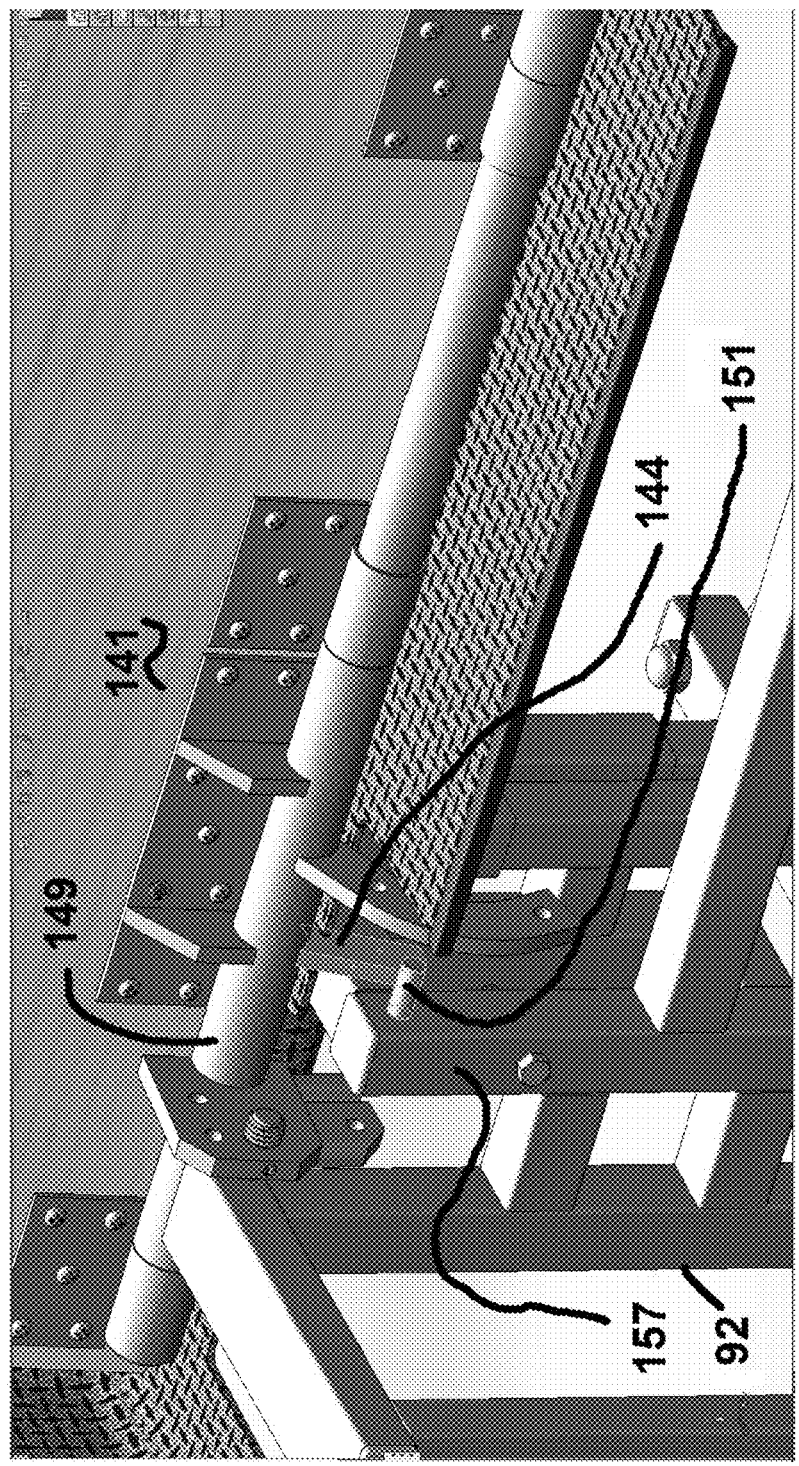
FIG. 17B is a partial cutaway perspective view of the mobile bench of FIG. 12 in a mobile storage position, including a stop mechanism thereof.
Figure 18:
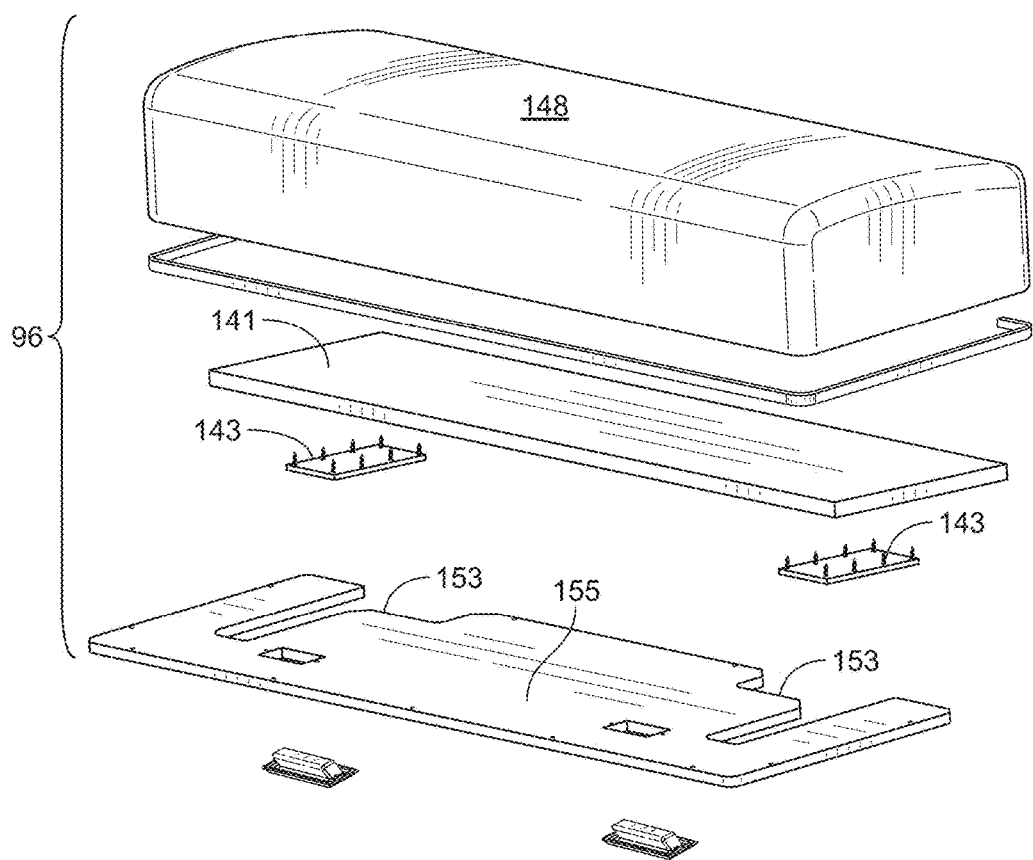
FIG. 18 is an exploded perspective view of a seat of the mobile bench depicted in FIGS. 12-16.

Likewise, a stop mechanism is preferably provided to prevent seat 96 from pivoting upward beyond a desired limit, such as to maintain a clearance between a seat back shell 145 and a seat shell 148 (both described below), as in the fully folded position of bench 10" shown in FIG. 13. For example, as illustrated in FIG. 17B, a stop tab 144 may be affixed to a seat pivot bushing 149, and a stop post 151 may be affixed to an inner upright 157 of stationary frame 92 to obstruct further pivoting of seat pivot bushing 149 when stop tab 144 meets stop post 151.

In addition to the components described in the above paragraphs, bench 10" may incorporate any suitable combination of panels, contoured shells, cushions or other appropriate seat cover structure to promote ergonomics, comfort, and/or aesthetic appeal. For example, as illustrated in 12-16 and 18-20, seat back 98 may include a seat back shell 145, and seat 96 may include a seat shell 148, each formed from any suitable material and attached in any suitable manner, as described above for bench 10. Also similarly to bench 10, notches 150 (shown in FIG. 19) are preferably provided in a bottom front edge of seat back shell 145, notches 152 (shown in FIG. 15) in a bottom rear edge of seat shell 148, and notches 153 in a seat bottom cover panel 155 to permit varying degrees of protrusion of members 102, actuators 104, and seat leg beams 135 into the interiors of seat back shell 145 and seat shell 148 as bench 10" is folded and unfolded.

In bench 10" as depicted, a seat back panel 154 is sized and shaped to approximately match an open back side of seat back shell 145, as illustrated in the exploded view of FIG. 19. Alternatively, a seat back panel resembling privacy panel 84 of bench 10, having a substantial area extending above seat back shell 145, may be employed. Illustrated in FIG. 20 is an example arrangement of a booth 156 defined by a pair of benches 10" as previously described, facing opposite sides of a table 158. Advantageously, table 158 is itself mobile, being supported on standard locking casters 160. Thus, the entire booth 156 may be moved away to facilitate cleaning or storage thereof, cleaning adjacent floor and wall surfaces, or rearranging the layout of a dining area.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A mobile folding bench comprising
a generally vertically oriented seat back comprising a forward facing seat back surface configured to support the back of a sitting human occupant;
a seat comprising a sitting surface configured to seat the human occupant, the seat disposed in front of the seat back;
a mobile base comprising at least one mobile support member adapted to support the mobile base on a floor surface and to facilitate lateral movement of the mobile base relative to the floor surface;
a stationary base movably coupled to the mobile base to permit at least vertical movement of the stationary base relative to the mobile base, the stationary base comprising at least one stationary support member adapted to support the stationary base on a generally horizontal floor surface and to inhibit lateral movement of the stationary base relative to the floor surface, the seat being supported by and pivotally coupled to the stationary base to move between a seating position in which the sitting surface is at a generally horizontal sitting angle and a folded position in which the sitting surface is at a generally vertical folded angle;
the seat back being supported by at least one of the mobile base and the stationary base;
a base biasing member connected between the mobile base and the stationary base and biasing the stationary base in a generally upward direction relative to the mobile base, the biasing member providing a sufficient base biasing force to maintain the stationary support member at a vertical clearance distance above the floor surface when the mobile support member contacts the floor surface and the seat is in the folded position, so that the folding bench is supported on the floor surface by the mobile support member; and
an engagement member operatively connected to the seat and configured to transmit a lifting force from the stationary base to lift the mobile base relative to the stationary base when the seat is moved from the folded position to the seating position, so that the folding bench is supported on the floor surface by the stationary support member.

2. The folding bench of claim 1, the mobile support member comprising a swivel caster.

3. The folding bench of claim 1, the engagement member being integral to the seat.

4. The folding bench of claim 1, further comprising an actuation member operatively connected to the mobile base, the engagement member configured to contact the actuation member and to transmit a lifting force from the stationary base to the mobile base through the actuation member during movement of the seat from the folded position to the seating position.

5. The folding bench of claim 4, the engagement member configured to contact the actuation member at an engagement position of the seat between the folded position and the seating position, to be spaced apart from the actuation member when the seat is between the folded position and the engagement position, and to remain in contact with the actuation member when the seat is between the engagement position and the seating position.

6. The folding bench of claim 4, the engagement member comprising a hook-shaped contact portion configured to maintain generally vertical normal contact with a lower portion of the actuation member during pivotal movement of the engagement member and vertical movement of the actuation member.

7. The folding bench of claim 4, the actuation member comprising a generally horizontal bar housed in a bushing, the bushing configured to be contacted by the engagement member and to rotate around the bar during movement of the engagement member in contact with the bushing to inhibit rubbing between the engagement member and the actuation member.

8. The folding bench of claim 4, the actuation member being integral to the mobile base.

9. The folding bench of claim 1, further comprising a front leg member pivotally connected to the seat at an upper end of the front leg member, the front leg member being configured to contact the floor surface and to transmit a portion of a weight of the seat to the floor surface when the seat is in the seating position, and to pivotally retract toward the seat to a stowed position when the seat is in the folded position.

10. The folding bench of claim 1, wherein when the seat is in the seating position with human occupants seated thereon in normal sitting positions, the at least one stationary support member is configured to support at least substantially the entire weight of the folding bench, and at least substantially the entire weight of the occupants transmitted to the seat.

11. The folding bench of claim 1, a generally downward facing surface of the seat configured to abut a generally upward facing surface of the stationary base when the seat is in the seating position, to prevent over-travel of the seat past the seating position.

12. The folding bench of claim 11, further comprising an elongate, generally vertical leg member of the stationary base, the leg member contacting the floor surface at a contact location disposed generally below the upward facing surface of the stationary base.

13. The folding bench of claim 1, the stationary base being connected to the mobile base by a sliding connection constraining the stationary base to generally vertical upward and downward movement relative to the mobile base.

14. The folding bench of claim 13, said sliding connection comprising a smaller perimeter tube integral to one of the stationary base and the mobile base slidingly housed in a larger perimeter tube integral to the other of the stationary base and the mobile base.

15. The folding bench of claim 14, further comprising a generally horizontal pin carried by one of the smaller perimeter tube and the larger perimeter tube, the other of the smaller perimeter tube and the larger perimeter tube comprising a generally vertical slot slidably receiving the pin, the slot comprising an upper end and a lower end, the pin abutting against one of said ends of the slot at an uppermost position of the stationary base relative to the mobile base, and the pin abutting against the other of said ends of the slot at a lowermost position of the stationary base relative to the mobile base, to prevent upward movement of the stationary base from said uppermost position or downward movement of the stationary base from said lowermost position.

16. The folding bench of claim 1, further comprising a stop mechanism to limit vertical travel of the stationary base relative to the mobile base to movement between an uppermost position of the stationary base and a lowermost position of the stationary base.

17. The folding bench of claim 1, further comprising a retention mechanism configured to be engaged when the seat is in the seating position and to resist movement of the seat away from the seating position or upward movement of the stationary base relative to the mobile base.

18. The folding bench of claim 17, the retention mechanism comprising a detent mechanism in which a rounded surface of a detent member carried by one of the stationary base and the mobile base is received by and generally horizontally biased into a detent recess carried by the other of the stationary base and the mobile base, so that movement of the seat toward the folded position or downward movement of the mobile base relative to the stationary base requires applying a force sufficient to dislodge the detent member from the detent recess, the base biasing force of the base biasing member being insufficient to dislodge the detent member from the detent recess.

19. A method of arranging restaurant booth style seating using two mobile folding benches and a table, each mobile folding bench comprising a generally vertically oriented seat back comprising a forward facing seat back surface configured to support the back of a sitting human occupant; a seat comprising a sitting surface configured to seat the human occupant, the seat disposed in front of the seat back; a mobile base comprising at least one mobile support member adapted to support the mobile base on a floor surface and to facilitate lateral movement of the mobile base relative to the floor surface; a stationary base movably coupled to the mobile base to permit at least vertical movement of the stationary base relative to the mobile base, the stationary base comprising at least one stationary support member adapted to support the stationary base on a generally horizontal floor surface and to inhibit lateral movement of the stationary base relative to the floor surface, the seat being supported by and pivotally coupled to the stationary base to move between a seating position in which the sitting surface is at a generally horizontal sitting angle and a folded position in which the sitting surface is at a generally vertical folded angle; the seat back being supported by at least one of the mobile base and the stationary base; a base biasing member connected between the mobile base and the stationary base and biasing the stationary base in a generally upward direction relative to the mobile base, the biasing member providing a sufficient base biasing force to maintain the stationary support member at a vertical clearance distance above the floor surface when the mobile support member contacts the floor surface and the seat is in the folded position, so that the folding bench is supported on the floor surface by the mobile support member; and an engagement member operatively connected to the seat and configured to lift the mobile base relative to the stationary base when the seat is moved from the folded position to the seating position, so that the folding bench is supported on the floor surface by the stationary support member; the method comprising

- moving a first one of the benches having a first seat in the folded position, having a first mobile base engaging a floor surface, to a position in which a first seat back surface of the first bench faces a first side of the table;
- unfolding the first seat to the seating position to cause a first mobile base of the first bench to disengage from the floor surface and a first stationary base of the first bench to engage the floor surface;
- moving a second one of the benches having a second seat in the folded position, having a second mobile base engaging a floor surface, to a position in which a second seat back surface of the second bench faces a second side of the table; and
- unfolding the second seat to the seating position to cause a second mobile base of the second bench to disengage from the floor surface and a second stationary base of the second bench to engage the floor surface.

20. The method of claim 19, further comprising engaging a retention mechanism of at least one of the first bench and the second bench when the respective seat is in the seating position, the retention mechanism resisting the respective base biasing force of the respective base biasing member to retain the respective seat in the seating position and the respective stationary frame in engagement with the floor surface.

* * * * *